United States Patent
Nash et al.

(10) Patent No.: US 11,853,302 B1
(45) Date of Patent: Dec. 26, 2023

(54) AUTOMATICALLY STARTING ACTIVITIES UPON CROSSING THRESHOLD

(71) Applicant: Avalara, Inc., Seattle, WA (US)

(72) Inventors: Nikki Nash, Seattle, WA (US);
Gregory T. Kavounas, Bellevue, WA (US); Stefan Kim, Maple Valley, WA (US); Aaron Lee Robles, Bainbridge Island, WA (US); Robert Erdman, Bremerton, WA (US); Mark Alan Withers, Bainbridge Island, WA (US); Tim Diekmann, San Jose, CA (US)

(*) Notice: Subject to any disclaimer, the term of this patent is extended or adjusted under 35 U.S.C. 154(b) by 3 days.

(21) Appl. No.: 17/338,220

(22) Filed: Jun. 3, 2021

Related U.S. Application Data

(60) Provisional application No. 63/055,825, filed on Jul. 23, 2020.

(51) Int. Cl.
| G06F 16/2455 | (2019.01) |
| G06F 16/248 | (2019.01) |
| G06F 16/28 | (2019.01) |

(52) U.S. Cl.
CPC ...... *G06F 16/24568* (2019.01); *G06F 16/248* (2019.01); *G06F 16/24564* (2019.01); *G06F 16/288* (2019.01)

(58) Field of Classification Search
None
See application file for complete search history.

(56) References Cited

U.S. PATENT DOCUMENTS

| 5,335,169 | A | 8/1994 | Chong | |
| 6,993,502 | B1 * | 1/2006 | Gryglewicz | G06Q 40/123 705/19 |
| 7,257,553 | B1 | 8/2007 | Baker | |
| 7,783,536 | B2 | 8/2010 | William et al. | |
| 7,933,803 | B1 | 4/2011 | Nadler et al. | |
| 8,099,342 | B1 | 1/2012 | Christian et al. | |
| 8,386,344 | B2 | 2/2013 | Christian et al. | |
| 8,620,578 | B1 | 12/2013 | Brown et al. | |
| 8,725,407 | B2 | 5/2014 | Hurley et al. | |
| 9,760,915 | B2 | 9/2017 | Pavlou et al. | |
| 10,445,818 | B1 | 10/2019 | Chowdhary | |

(Continued)

OTHER PUBLICATIONS

TaxJar, "The Seller's Guide to eCommerce Sales Tax", 2018 (Year: 2018).*

(Continued)

*Primary Examiner* — Dawaune A Conyers
(74) *Attorney, Agent, or Firm* — Jeremiah J. Baunach; VLP Law Group LLP

(57) ABSTRACT

A particular option selection may be provided by an online service platform (OSP) to a client regarding one or more predefined services that the OSP can be configured to perform. These may include automatic activities option selection(s) that may trigger the OSP to automatically start one or more activities upon one or more thresholds being crossed. The OSP may apply digital rules to the dataset(s) of the client to determine whether or not to automatically start or stop activities, including producing respective resources, upon a threshold being crossed, to determine a requested resource and then push, send, or otherwise cause to be transmitted a notification regarding the produced resource or other activities.

15 Claims, 23 Drawing Sheets

(56) References Cited

U.S. PATENT DOCUMENTS

| | | | |
|---|---|---|---|
| 10,572,953 | B1 | 2/2020 | Char et al. |
| 10,614,130 | B1 | 4/2020 | Pai et al. |
| 10,769,611 | B2 | 9/2020 | McNeel |
| 11,238,542 | B1 | 2/2022 | Wixted et al. |
| 2002/0138765 | A1 | 9/2002 | Fishman et al. |
| 2003/0055754 | A1* | 3/2003 | Sullivan ............... G06Q 30/02 705/31 |
| 2003/0093320 | A1 | 5/2003 | Sullivan et al. |
| 2003/0101112 | A1 | 5/2003 | Gallagher et al. |
| 2003/0144931 | A1 | 7/2003 | Stokes et al. |
| 2006/0085275 | A1 | 4/2006 | Stokes et al. |
| 2006/0235776 | A1* | 10/2006 | Temme ............... G06Q 40/00 705/31 |
| 2007/0136158 | A1 | 6/2007 | Rawlings et al. |
| 2007/0136159 | A1 | 6/2007 | Rawlings et al. |
| 2007/0203718 | A1 | 8/2007 | Merrifield, Jr. |
| 2008/0154754 | A1 | 6/2008 | William et al. |
| 2013/0013471 | A1 | 1/2013 | Fishman |
| 2013/0290200 | A1 | 10/2013 | Singhal et al. |
| 2014/0172526 | A1 | 6/2014 | Arrocho et al. |
| 2016/0140668 | A1 | 5/2016 | Maguire et al. |
| 2017/0140471 | A1 | 5/2017 | Hemberg et al. |
| 2020/0349572 | A1* | 11/2020 | O'Sullivan .......... G06Q 20/407 |
| 2020/0356974 | A1 | 11/2020 | McNeel |
| 2021/0233181 | A1* | 7/2021 | Bubalo ............... G06F 40/289 |

OTHER PUBLICATIONS

Maccarrone, "The Impact of the U.S. Supreme Court's Decision in *South Dakota* v. *Wayfair*," 2021, retrieved from https://www.cpajournal.com/2021/04/26/the-impace-of-the-u-s-supreme-courts-decision-in-south-dakota-v-wayfair/, 11 pages.

Morgan et al., "Assembling Parameters to Compute Taxes for Cross-Border Sales," U.S. Appl. No. 16/696,062, filed Nov. 26, 2019, 75 pages.

Smith, "Due Process Implications Related to State Notice and Economic Nexus Laws," *Tax Lawyer* 70(4):833-868, 2017.

U.S. Appl. No. 16/585,829, filed Sep. 27, 2019.

U.S. Appl. No. 16/775,771, filed Jan. 29, 2020.

U.S. Appl. No. 16/834,934, filed Mar. 30, 2020.

"Sales and Transactions Checker for Economic Nexus," TaxJar, Feb. 19, 2019, https://www.taxjar.com/sales-and-transactions-checker/, 8 pages.

"The Seller's Guide to eCommerce Sales Tax," TaxJar, Jun. 18, 2019, https://www.taxjar.com/guides/intro-to-sales-tax/, 19 pages.

Yetter, "Sales Tax Institute helps you understand sales and use tax obligations," YouTube Video, Dec. 15, 2011, URL=https://www.youtube.com/watch?v=gKFe1W062Ok&feature=emb_logo, download date Sep. 10, 2019, 1 page. (Screenshot).

"How do I know if I should be collecting tax in a state?" Sales Tax Institute, Aug. 12, 2017, https://www.salestaxinstitute.com/sales_tax_faqs/should_i_collect_tax, 2 pages.

"What is Nexus?" Sales Tax Institute, Aug. 26, 2019, https://www.salestaxinstitute.com/sales_tax_faqs/what_is_nexus, 6 pages.

"Sales Tax Nexus Guide", taxconnex, Whitepaper Download, 2019, 18 pages.

Seth Therrien et al., "Tax Nexus Notification Platform ," U.S. Appl. No. 16/585,829, filed Sep. 27, 2019. (72 pages).

Ellen Wixted et al., "Online Interactive Notification Platform for Exploring Possible Tax Nexus and Implications," U.S. Appl. No. 16/775,771, filed Jan. 29, 2020. (111 pages).

Stefan Kim et al., "Disestablishing Entity's Selected Resource Computation in Response to Loss of Nexus Establishment Condition for Selected Domain," U.S. Appl. No. 16/834,934, filed Mar. 30, 2020. (63 pages).

* cited by examiner

800

```
┌─────────────────────────────────────────────────────────────────┐
│ 802 DETERMINE WHETHER OR NOT ONE OR MORE DIGITAL RULES INDICATE │
│     TO NOT COUNT RELATIONSHIP INSTANCE IF AN EXEMPTION IS       │
│     ASSOCIATED WITH THE RELATIONSHIP INSTANCE                   │
└─────────────────────────────────────────────────────────────────┘
                                │
                                ▼
┌─────────────────────────────────────────────────────────────────┐
│ 804 DETERMINE WHETHER OR NOT AN EXEMPTION IS ASSOCIATED WITH    │
│     THE RELATIONSHIP INSTANCE                                   │
└─────────────────────────────────────────────────────────────────┘
                                │
                                ▼
┌─────────────────────────────────────────────────────────────────┐
│ 806 INCREMENT FIRST COUNTER IS BASED ON A DETERMINATION THAT    │
│     THERE IS NOT AN EXEMPTION                                   │
└─────────────────────────────────────────────────────────────────┘
```

```
1300   PROGRAM EXACT_TURNOVER
1305   '
1310   Domain_Nexus=FALSE
1318   '
1320   continue     'beginning of every year – initialize:
1324   Total_transactions_in_domain  0
1326   Total_amount_in_domain  0
1328   '
1330   continue     'receive dataset for new transaction:
1332   input (New_Trans._jdx, New_Trans._Amount)
1334   New_Trans._jdx =? Domain_name
1335   if no, goto 1330            'this transaction outside this domain, so discard and return
1338   '
1340   continue     ' this transaction is in the domain so, update:
1342   Total_transactions_in_domain  Total_transactions_in_domain +1
1344   Total_amount_in_domain  Total_amount_in_domain + New_Trans._Amount
1348   '
1350   continue     ' check if nexus thresholds were reached:
1352   Total_transactions_in_domain >? Transaction_threshold_in_domain
1354   if yes, goto 1370     'nexus threshold crossed
1356   Total_amount_in_domain >? Amount_threshold_in_domain
1354   if yes, goto 1370     'nexus threshold crossed
1358   '
1360   new year started?    'nexus thresholds not crossed
1362   if no, go to 1330    'and new year not started,
1364   if yes, go to 1320        'new year started, will also re- initialize
1368   '
1370   Domain_Nexus=TRUE     'and process for nexus:
1380   input (instructions about initiating registration),
1390   (compute resource)
```

FIGURE 13

AUTOMATICALLY STARTING ACTIVITIES UPON CROSSING THRESHOLD

TECHNICAL FIELD

The technical field relates to computers in networks, and particularly to networked automated systems for an online software platform (OSP) to enable automatically starting activities upon crossing a threshold.

BRIEF SUMMARY

The present description gives instances of computer systems, devices and storage media that may store programs and methods.

Clients are notified (distracted) by an OSP when datasets of the client indicate to the OSP that a threshold is being approached or crossed, and then the clients themselves are required (burdened) to make decisions based on the threshold that is being approached or crossed. The client must go in to the system themselves to manually start activities based on those decisions. Also, the clients may call the OSP (burden to the OSP) first to find out when exactly the threshold is crossed, and/or make adjustments to their activities if crossed already. Then the clients may also need to register with a particular domain associated with the datasets for performing activities related to the threshold being crossed. All of these activities are to happen many times, once for each of many different domains for each client, which results in additional processing, storage, and/or data transmission resources being used.

To solve the above technical problems, option selections may be provided by the OSP to the client regarding one or more predefined services that the OSP can be configured to perform. These may include automatic activities option selection(s) that may trigger the OSP to automatically start one or more activities upon one or more thresholds being crossed. The OSP may apply digital rules to the dataset(s) of the client to determine whether or not to automatically start or stop activities, including producing respective resources, upon a threshold being crossed, to determine a requested resource and then push, send, or otherwise cause to be transmitted a notification regarding the produced resource or other activities.

Therefore, the systems and methods described herein for automatically starting activities upon crossing a threshold improve the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

As shown above and in more detail throughout the present disclosure, the present disclosure provides technical improvements in computer networks to existing computerized systems to facilitate estimation of resources.

These and other features and advantages of the claimed invention will become more readily apparent in view of the embodiments described and illustrated in this specification, namely in this written specification and the associated drawings.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

FIG. 8 is a flowchart for illustrating a sample method for handling exemptions that may be is associated with a relationship instance in producing resources based on a threshold being crossed that is useful in the method of FIG. 7, according to embodiments of the present disclosure, which is an improvement in automated computerized systems.

FIG. 13 is a listing of example pseudocode for a sample method for automatically starting transaction tax computations for transactions and enabling collection of transaction tax for transactions upon a threshold for purposes of establishing economic *nexus* in a particular tax jurisdiction being crossed, according to embodiments of the present disclosure, which is an improvement in automated computerized systems.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1:
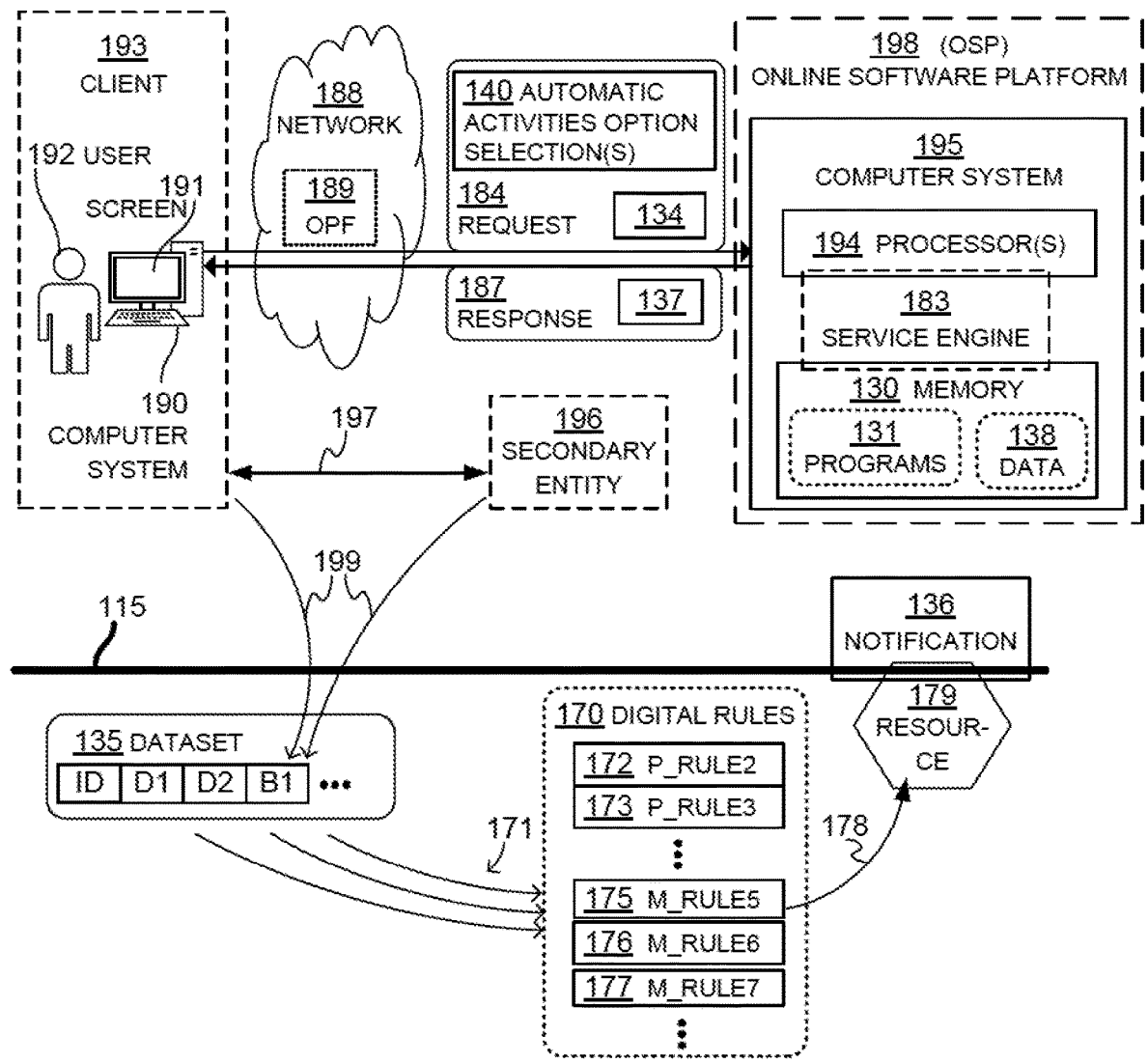
FIG. 1 is a diagram showing sample aspects of embodiments of the present disclosure involving receiving input indicating a client has selected an automatic activities option to automatically start activities upon crossing a threshold, according to embodiments of the present disclosure, which is an improvement in automated computerized systems.

FIG. 1 is a diagram showing sample aspects of embodiments of the present disclosure involving receiving input indicating a client has selected an automatic activities option to automatically start activities upon crossing a threshold, according to embodiments of the present disclosure, which is an improvement in automated computerized systems.

A thick line 115 separates this diagram, although not completely or rigorously, into a top portion and a bottom portion. Above the line 115 the emphasis is mostly on entities, components, their relationships, and their interactions, while below the line 115 emphasis is mostly on processing of data that takes place often within one or more of the components above the line 115.

Above the line 115, the sample computer system 195, network 188, client computer system 190 and secondary entity 196 according to embodiments is shown. The computer system 195 has one or more processors 194 and a memory 130. The memory 130 stores programs 131 and data 138. The one or more processors 194 and the memory 130 of the computer system 195 thus implement a service engine 183. Additional implementation details for the computer system 195 are given later in this document.

The computer system 195 can be located in "the cloud." In fact, the computer system 195 may optionally be implemented as part of an online software platform (OSP) 198. The OSP 198 can be configured to perform one or more predefined services, for example, via operations of the service engine 183. Such services can be, but are not limited to: producing respective resources by applying digital rules to respective datasets received by clients, such as client 193; automatically start or stop activities, including producing respective resources, upon a threshold being crossed, such as may be determined based on the application of digital rules to respective datasets received by clients; causing notifications to be transmitted to clients about aspects of produced resources; and so on, including what is described in this document. Such services can be provided as a Software as a Service (SaaS).

A user 192 may be standalone. The user 192 may use a computer system 190 that has a screen 191, on which User Interfaces (UIs) may be shown. Additional sample implementation details for the computer system 190 are given later in this document. In embodiments, the user 192 and the computer system 190 are considered part of a primary entity, such as client 193, which can be referred to also merely as entity. In such instances, the user 192 can be an agent of the entity 193, and even within a physical site of the entity 193, although that is not necessary. In embodiments, the computer system 190 or other device of the user 192 or the entity 193 are client devices for the computer system 195.

The computer system 190 may access the computer system 195 via a communication network 188, such as the internet. In particular, the entities and associated systems of FIG. 1 may communicate via physical and logical channels of the communication network 188. For example, information may be communicated as data using the Internet Protocol (IP) suite over a packet-switched network such as the Internet or other packet-switched network, which may be included as part of the communication network 188. The communication network 188 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode ("ATM") systems, frame relay systems, digital subscriber line ("DSL") systems, radio frequency ("RF") systems, telephone systems, cellular systems, other wireless systems, and the Internet. In various embodiments the communication network 188 can be or include any type of network, such as a local area network (LAN), a metropolitan area network (MAN), a wide area network (WAN), or the internet.

Downloading or uploading may be permitted from one of these two computer systems to the other, and so on. Such accessing can be performed, for instance, with manually uploading files, like spreadsheet files, etc. Such accessing can also be performed automatically as shown in the example of FIG. 1. The computer system 190 and the computer system 195 may exchange requests and responses with each other. Such can be implemented with a number of architectures.

In one such architecture, a device remote to the service engine 183, such as computer system 190, may have a certain application (not shown) and a connector (not shown) that is a plugin that sits on top of that certain application. The connector may be able to fetch from the remote device the details required for the service desired from the OSP 198, form an object or payload 134, and then send or push a request 184 that carries the payload 134 to the service engine 183 via a service call. The service engine 183 may receive the request 184 with the payload 134. The request 184 may also include particular option selections regarding the one or more predefined services that the OSP 198 can be configured to perform, such as automatic activities option selection(s) 140 that may trigger the service engine 183 to automatically start one or more activities upon one or more thresholds being crossed.

The service engine 183 may then apply digital rules 170 to the payload 134 to determine whether or not to automatically start or stop activities, including producing respective resources, upon a threshold being crossed, to determine a requested resource 179, form a payload 137 that is an aspect of the resource 179, and then push, send, or otherwise cause to be transmitted a response 187 that carries the payload 137 to the connector. The connector reads the response 187 and forwards the payload 137 to the certain application. In some embodiments, the OSP 198 may generate and deliver a software development kit (SDK) (not shown) including libraries, documentation, code samples, processes, and guides that the client 193 can use and integrate with the connector and other applications of the computer system 190 to implement functionality described herein. The SDK may be a collection of software development tools in one package installable by the client computer system 190. The SDK may facilitate the creation of applications by having a compiler, debugger and a software framework. The SDK may include libraries, documentation, code samples, processes, and guides that the client 193 can use and integrate with the connector and other applications of the computer system 190 to implement the functionality described herein. In various embodiments, the connector may have been built by the client 193, the OSP 198 or another entity. The client 193 may use the SDK for controlling the developing and adjusting, from the client-side, operations of the connector.

In an alternative such architecture, a device remote to the service engine 183, such as computer system 190, may have a particular application (not shown). In addition, the computer system 195 may implement a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. This alternative architecture enables the client 193 to directly consume a REST API from their particular application, without using a connector. The particular application of the remote device may be able to fetch internally from the remote device the details required for the service desired from the OSP 198, and thus send or push the request 184 to the REST API. In turn, the REST API talks in background to the service engine 183. Again, the service engine 183 determines the requested resource 179, and sends an aspect of it back to the REST API. In turn, the REST API sends the response 187 that has the payload 137 to the particular application.

Moreover, in some embodiments, data from the computer system 190 and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, the computer system 190 and any devices of the OPF 189 can be considered to be remote devices, at least from the perspective of the computer system 195.

In some instances, the user 192 or the client 193 may have instances of relationships with secondary entities. Only one such secondary entity 196 is shown. However, additional secondary entities may be present in various other embodiments. For example, the client 193 may have a relationship instance 197 with the secondary entity 196 via an intermediary entity (not shown).

In some instances, the user 192 and the client 193 may have data about one or more secondary entities, for example via relationship instances of the user 192 or primary entity with the secondary entity 196. The client 193, an intermediary entity and/or the secondary entity 196 may be referred to as simply entities. One of these entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, and so on.

In embodiments, the computer system 190 generates one or more datasets. A sample generated dataset 135 is shown below the line 115. The dataset 135 has values that can be numerical, alphanumeric, Boolean, and so on, as needed for what the values characterize. For example, an identity value ID may indicate an identity of the dataset 135, so as to differentiate it from other such datasets. At least one of the values of the dataset 135 may characterize an attribute of a certain one of the entities 193 and 196. (It should be noted that the arrows 199 describe a correspondence, but not the journey of data in becoming the dataset 135.) For instance, a value D1 may be the name of the certain entity, a value D2 may be for relevant data of the entity, and so on. Plus, an optional value B1 may be a numerical base value for an aspect of the dataset, and so on. The aspect of the dataset may be the aspect of the value that characterizes the attribute, an aspect of the reason that the dataset was created in the first place, an indication of an identity or other characteristic of the client 193 and/or the secondary entity 196, etc. The dataset 135 may further have additional such values, as indicated by the horizontal dot-dot-dot to the right of the dataset 135. In some embodiments, the dataset 135 has values that characterize attributes of each of the client 193 and the secondary entity 196, but that is not required.

In embodiments, stored digital rules 170 may be accessed by the computer system 195. These rules 170 are digital in that they are implemented for use by software. For example, these rules 170 may be implemented within programs 131 and data 138. The data portion of these rules 170 may alternately be implemented in memories in other places, which can be accessed via the network 188. These rules 170 may be accessed responsive to receiving a dataset, such as the dataset 135.

The digital rules 170 may include main rules, which can thus be accessed by the computer system 195. In this example, three sample digital main rules are shown explicitly, namely M_RULE5 175, M_RULE6 176, and M_RULE7 177. In this example, the digital rules 170 also include digital precedence rules P_RULE2 172 and P_RULE3 173, which can thus be further accessed by the computer system 195. The digital rules 170 may include additional rules and types of rules, as suggested by the vertical dot-dot-dots.

In embodiments, a certain one of the digital main rules may be identified from among the accessed stored rules by the computer system 195. In particular, values of the dataset 135 can be tested, according to arrows 171, against logical conditions of the digital main rules, as described later in this document. In this example, the certain main rule M_RULE5 175 is thus identified, which is indicated also by the beginning of an arrow 178 that is described in more detail later in this document. Identifying may be performed in a number of ways depending on how the digital main rules are implemented. An example is now described.

Figure 2:
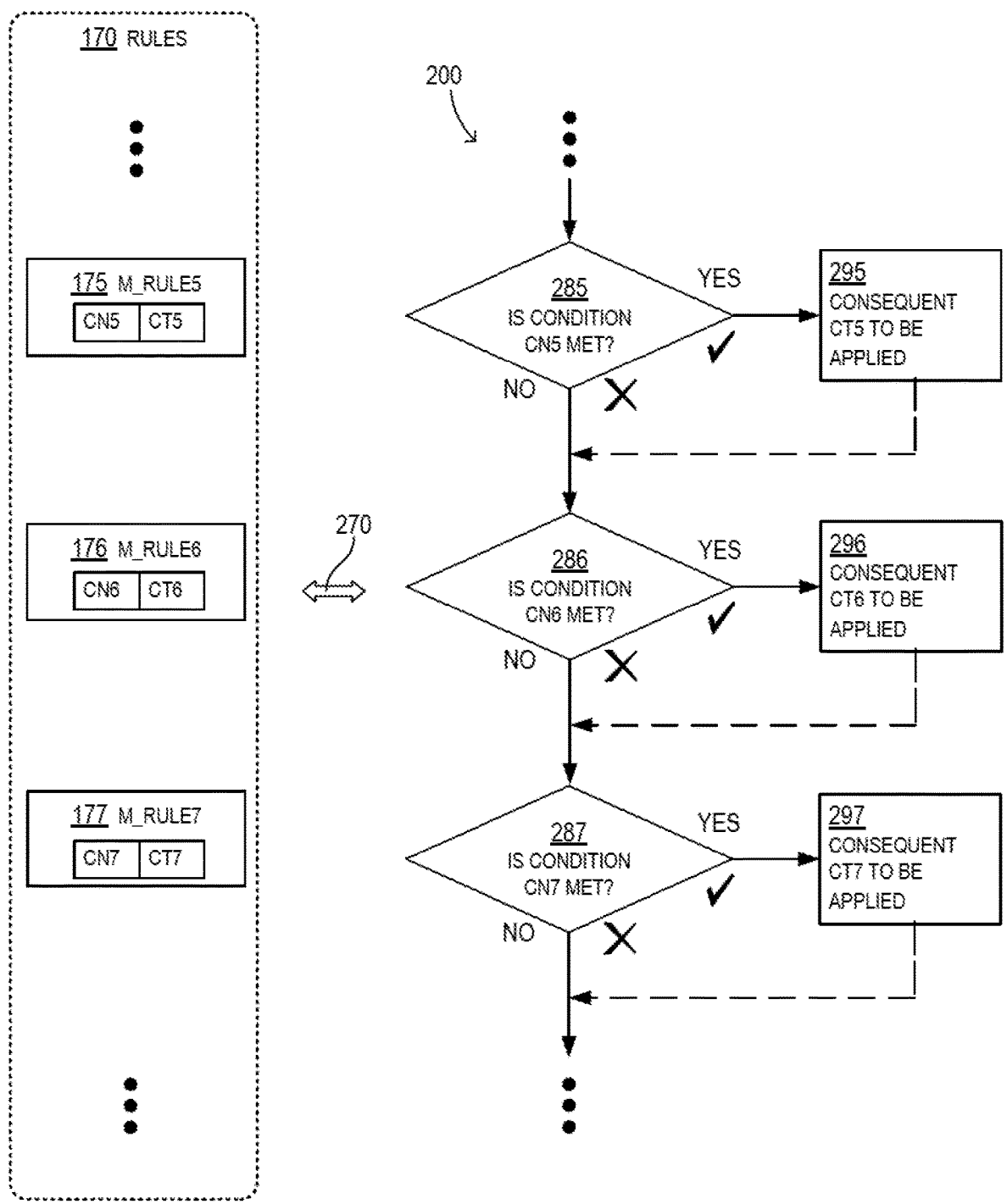
FIG. 2 is a diagram that repeats some of the digital main rules of FIG. 1 in more detail, and juxtaposes them with a flowchart portion for a sample method of how it may be recognized that conditions of a certain digital main rule can be met for its consequent to be applied, all according to embodiments of the present disclosure, which is an improvement in automated computerized systems.

Referring now also to FIG. 2, some of the digital main rules of digital rules 170 are repeated from FIG. 1 in more detail. In addition, according to an arrow 270, these digital main rules are shown juxtaposed with a flowchart portion 200. In embodiments, some of the digital main rules can be expressed in the form of a logical "if-then" statement, such as: "if P then Q". In such statements, the "if" part, represented by the "P", is called the condition, and the "then" part, represented by the "Q", is called the consequent. Therefore, at least some of the digital main rules include respective conditions and respective consequents associated with the respective conditions, respectively. And, for a certain digital main rule, if its certain condition P is met, then its certain consequent Q is what happens or becomes applied. Of course, one or more of the digital rules 170 may have more than one conditions P that both must be met, and so on. And some of these digital rules 170 may be searched for, and grouped, according first to one of the conditions, and then the other. In this example, the digital main rules M_RULE5 175, M_RULE6 176, and M_RULE7 177 of FIG. 1, include respective conditions CN5, CN6, CN7, and respective consequents CT5, CT6, CT7 associated with the respective conditions CN5, CN6, CN7, respectively.

In embodiments, therefore, identifying is performed by recognizing, by the computer system 195, that a certain condition of a certain one of the accessed digital main rules is met by one or more of the values of the dataset. An example of the operations of recognizing that a condition is met and thus identifying an applicable rule is shown by flowchart portion 200 of FIG. 2. According to successive decision diamonds 285, 286, 287, it is determined whether or not conditions CN5, CN6, CN7 are met by at least one of the values of the dataset, respectively. If the answer is NO, then execution may proceed to the next diamond. If the answer is YES then, according to operations 295, 296, 297, it is further determined that the respective consequents CT5, CT6, CT7 are to be applied, and then execution may proceed to the next diamond in the flowchart portion. A consequent that is to be applied could be, for example, flagged as TRUE.

From what was mentioned in connection with FIG. 1, the certain M_RULE5 175 was thus identified. With reference to FIG. 2, the identification may have happened at operation 285 of the flowchart portion 200, at which time it was recognized that condition CN5 was met by a value of the dataset 135. This made: the condition CN5 be the certain condition, the digital main rule M_RULE5 175 be the certain digital main rule, and the consequent CT5 be the certain consequent of the certain digital main rule M_RULE5 175. And the certain consequent CT5 is associated with the certain condition CN5, since both are included by the certain digital main rule M_RULE5 175. Therefore, according to operation 295, consequent CT5 is what happens or becomes applied, as described below.

A number of examples are possible for how to recognize that a certain condition of a certain digital rule is met by at least one of the values of the dataset. For instance, the certain condition could define a boundary of a region that is within a space. The region could be geometric, and even be within a larger space and may include political boundaries. For example, the region could be geographic, within the space of a city, a county, a state, a country, a continent or the earth. The boundary of the region could be defined in terms of numbers according to a coordinate system within the space. In the example of geography, the boundary could be defined in terms of groups of longitude and latitude coordinates. In such embodiments, the certain condition could be met responsive to the characterized attribute of the dataset being in the space and within the boundary of the region instead of outside the boundary. For instance, the attribute could be a location of the entity, and the one or more values of the dataset 135 that characterize the location could be one or more numbers or an address, or longitude and latitude. The condition can be met depending on how the one or more values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on.

In an example embodiment, the certain condition could define a threshold that needs to be crossed for an activity to be started or stopped. In such embodiments, the certain condition could be met responsive to a value based on one or more of the characterized attributes of one or more datasets, either individually or in aggregate, crossing the threshold.

The above embodiments are only examples, and not limiting. For instance, the example of FIG. 2 suggests that there is a one-to-one correspondence of the conditions with the associated consequents, but that is not necessary. In fact, a single consequent may be associated with two or more conditions, and two or more consequents may be associated with a single condition. Of course, all such can be shown as additional rules, with groups of them having the same condition or consequent.

For another instance, once it is determined that a consequent is to be applied, execution may even exit the flowchart portion 200. Or, as shown, it may be determined that more than one of the digital main rules is to be applied. In particular, operation 285 may give the answer YES such that consequent CT5 is to be applied, and operation 286 may also give the answer YES such that consequent CT6 is to be applied.

Where more than one of the digital main rules are found that could be applied, there are additional possibilities. For instance, the computer system 195 of FIG. 1 may further access at least one stored digital precedence rule, such as P_RULE2 172 or P_RULE3 173. Accordingly, the certain digital main rule may be thus identified also from the digital precedence rule. In particular, the digital precedence rule may decide which one or more of the digital main rules is to be applied. To continue the previous example, if a value of the dataset 135 that characterizes a location, and the location is within multiple overlapping regions according to multiple rules, the digital precedence rule may decide that all of them are to be applied, or less than all of them are to be applied. Equivalent embodiments are also possible, where digital precedence rules are applied first to limit the iterative search of the flowchart portion 200, so as to test the applicability of fewer than all the rules according to arrows 171.

In embodiments, a resource may be produced for the dataset 135, and/or other activities may be automatically started or stopped, by the computer system 195 applying the certain consequent of the certain digital main rule. The resource can be a computational result, a document, an item of value, a representation of an item of value, etc., made, created or prepared for the user 192, the client 193 and/or the secondary entity 196, etc., on the basis of the attribute. As such, in some embodiments, the resource is produced by a determination and/or a computation. In the example of FIG. 1, a resource 179 is produced for the dataset 135, by the computer system 195 applying the certain M_RULE5 175, and in particular its certain consequent CT5, as indicated by the arrow 178. In fact, sometimes applying the consequent is more simply stated as "applying the rule".

The resource may be produced in a number of ways. For example, the certain consequent can be applied to one of the values of the dataset 135. For instance, one of the values of the dataset 135 can be a numerical base value, e.g. B1, that encodes an aspect of the dataset 135, as mentioned above. In such cases, applying the certain consequent may include performing a mathematical operation on the base value B1. For example, applying the certain consequent may include multiplying the base value B1 with a number indicated by the certain consequent. Such a number can be, for example, a percentage, e.g., 1.5%, 3%, 5%, and so on. Such a number can be indicated directly by the certain rule, or be stored in a place indicated by the certain rule, and so on.

As mentioned above, in some embodiments two or more digital main rules may be applied. For instance, referring again to FIG. 1, the computer system 195 may recognize that an additional condition of an additional one of the accessed digital main rules 170 is met by at least one of the values of the dataset 135, either alone or in combination with other values of other datasets. In this example there would be no digital precedence rules, or the available digital precedence rules would not preclude both the certain digital main rule and the additional digital main rule from being applied concurrently. Such an additional digital main rule would have an additional consequent.

In such embodiments, the resource may be produced by the computer system applying the certain consequent and the additional consequent. For instance, where the base value B1 is used, applying the certain consequent may include multiplying the base value B1 with a first number indicated by the certain consequent, so as to compute a first product. In addition, applying the additional consequent may include multiplying the base value B1 with a second number indicated by the additional consequent, so as to compute a second product. And, the resource may be produced by summing the first product and the second product.

In embodiments, a notification can be caused to be transmitted, e.g., via the network 188, by the computer system. The notification can be about an aspect of the resource, that a condition is met or no longer met, a warning that a condition is or about to be met or no longer be met, that an activity has been or is about to be automatically started or stopped based on a condition being met or no longer being met, and/or include an option to enable or select a setting regarding a service provided by the OSP 198. In the example of FIG. 1, a notification 136 can be caused to be transmitted by the computer system 195, for example as an answer or other response to the received dataset 135. The notification 136 can be about an aspect of the produced resource 179. In particular, the notification 136 may inform about the aspect of the resource 179, namely that it has been determined, where it can be found, what it is, or at least a portion or a statistic of its content, a rounded version of it, and so on. The planning should be that the recipient of the notification 136 understands what it is being provided.

The notification 136 can be transmitted to one of an output device and another device. The output device may be the screen of a local user or a remote user. The notification 136 may thus cause a desired image, message, or other such notification to appear on the screen, such as within a Graphical User Interface (GUI) and so on. The other device can be the remote device, from which the dataset 135 was received, as in the example of FIG. 1. In particular, the computer system 195 may cause the notification 136 to be communicated by being encoded as a payload 137, which is carried by a response 187. The response 187 may be transmitted via the network 188 responsive to the received request 184. The response 187 may be transmitted to the computer system 190, or to OPF 189, and so on. As such, the other device can be the computer system 190, or the OPF 189, or the screen 191 of the user 192, and so on. In this example, the single payload 137 encodes the entire notification 136, but that is not required. Similarly with what is written above about encoding datasets in payloads, the notification 136 instead may be provided via two or more payloads, or in other cases the notification 136 and at least one other notification may be included in the same single payload. Along with the aspect of the resource 179, it can be advantageous to embed in the payload 137 the identity value (ID) and/or one or more values of the dataset 135. This will help the recipient correlate the response 187 to the request 184, and therefore match the received aspect of the resource 179 as the answer or other response to the appropriate dataset.

In an example embodiment, there may be a plurality of relationship instances between the client 193 and one or more secondary entities, such as secondary entity 196. In some embodiments, such relationship instances are between the client 193 and one or more secondary entities, such as secondary entity 196, via one or more intermediary entities (not shown). Each relationship instance may be associated with one or more respective domains of a plurality of domains. In various embodiments, a domain may be a region defined by a boundary as discussed above or may be an entity representing or otherwise associated with the region. For example, the region could be geographic, within the space of a city, a county, a state, a country, a continent or the earth.

For example, in one embodiment, client 193 may have a relationship instance 197 with secondary entity 196 and that particular relationship instance 197 may be associated with one or more domains. The association of the relationship instance 197 with the one or more domains may be based on a variety of characteristics including, but not limited to: a relationship of one or more of the primary entity and secondary entity with the particular domain; a location of one or more of the primary entity and secondary entity within or associated with the particular domain; a region or location associated with one or more of the primary entity and secondary entity being within or associated with the particular domain; a previous relationship of one or more of the primary entity and secondary entity with the particular domain; a location of items associated with one or more of the primary entity and secondary entity within the particular domain; a number of relationships of one or more of the primary entity and secondary entity with the particular domain; a transfer of items associated with one or more of the primary entity and secondary entity to or from an entity within or associated with the particular domain; a transfer of data associated with one or more of the primary entity and secondary entity to or from an entity within or associated the particular domain, etc. The existence or identification of the relationship instance 197 and/or one or more characteristics of the relationship instance 197 may be defined or represented by values of dataset 135.

In some embodiments, for each relationship instance of the plurality of relationship instances represented by dataset 135, the OSP 198 electronically identifies a rate to calculate an amount of resource due to one or more respective domains associated with the relationship instance based on particular attributes of the dataset 135 and the one or more respective domains. For example, the client 193 may send request 184 to the computer system 195 of OSP 198 for services that include producing resources based on the dataset 135. The request 184 may include the existence or identification of the relationship instance 197 and/or one or more characteristics of the relationship instance 197 as part of payload 134. The service engine 183 may then apply digital rules 170 to the relationship instance 197 and/or one or more characteristics of the relationship instance 197 to identify or otherwise determine the rate to calculate an amount of resource due to one or more respective domains associated with the relationship instance.

For example, digital precedence rule P_RULE2 172 may decide that rule M_RULE5 175 is to be applied when a particular condition is met. Digital precedence rule P_RULE2 172 may include a condition that indicates if a particular relationship instance is associated with a particular domain and/or a particular threshold has been crossed due to or otherwise regarding one or more attributes of the relationship instance, either alone or in combination with attributes of other relationship instances, then rule M_RULE5 175 is to be applied. The service engine 183 may determine that the condition is met due to one or more values of dataset 135 indicating the particular relationship instance and that the particular relationship instance is associated with the particular domain and/or a particular threshold has been crossed due to or otherwise regarding one or more attributes of the relationship instance, either alone or in combination with attributes of other relationship instances. Thus, as a consequent of precedence rule P_RULE2 172, the service engine 183 applies rule M_RULE5 175. Rule M_RULE5 175 may include a condition CN5 that indicates if a relationship instance is associated with that particular domain, then, as consequent CT5, a particular rate is to be used to calculate an amount of resource due to that particular domain.

Referring again to FIG. 2, at decision diamond 285 it is determined that the condition CN5 is met (i.e., that a particular attribute of the dataset is associated with a particular domain) and thus, the particular rate is used to calculate an amount of resource due to that particular domain. Thus, by applying digital rules 170, the service engine 183 identifies the rate to calculate an amount of resource due to one or more respective domains associated with the relationship instance based on one or more attributes of the dataset 135, and also calculates an amount of resources due to at least one respective domain associated with the relationship instance based on the identified rate. In some embodiments, this calculated amount of resources due may be included by the service engine 183 as part of the resulting produced resource 179 and/or notification 136. The service engine 183 may then form a payload 137 that is an aspect of the resource 179, and then push, send, or otherwise cause to be transmitted a response 187 that carries the payload 137 to a device remote to the service engine 183, such as computer system 190, a device of secondary entity 196 or another secondary entity. Digital rules 170 may include multiple different digital rules for each type of relationship instance and different domains. In various embodiments, the notification 136 may comprise the response 187, or the response 187 may be included in the notification 136.

The OSP 198 may also provide a selectable option to the client 193 to have the OSP 198 to automatically start or stop activities, such as production of resources for datasets associated with one or more particular domains, upon one or more respective thresholds associated with the particular domains being crossed regarding the datasets of the client 193 received by the OSP 198. The OSP 198 may receive a first input, such as automatic activities option selection(s) 140 as part of request 184, indicating whether or not the client has selected the option. In some embodiments, automatic activities option selection(s) 140 may be received with, in conjunction with, or as part of the payload 134. In some embodiments, the request 184 may include the dataset 135. However, in the present embodiment, the automatic activities option selection(s) 140 are received before the dataset 135. In various embodiments, the automatic activities option selection(s) 140 may be received by the OSP 198 during or after the initial onboarding or subscription of the client 193 to the services of the OSP 198.

Figure 3:
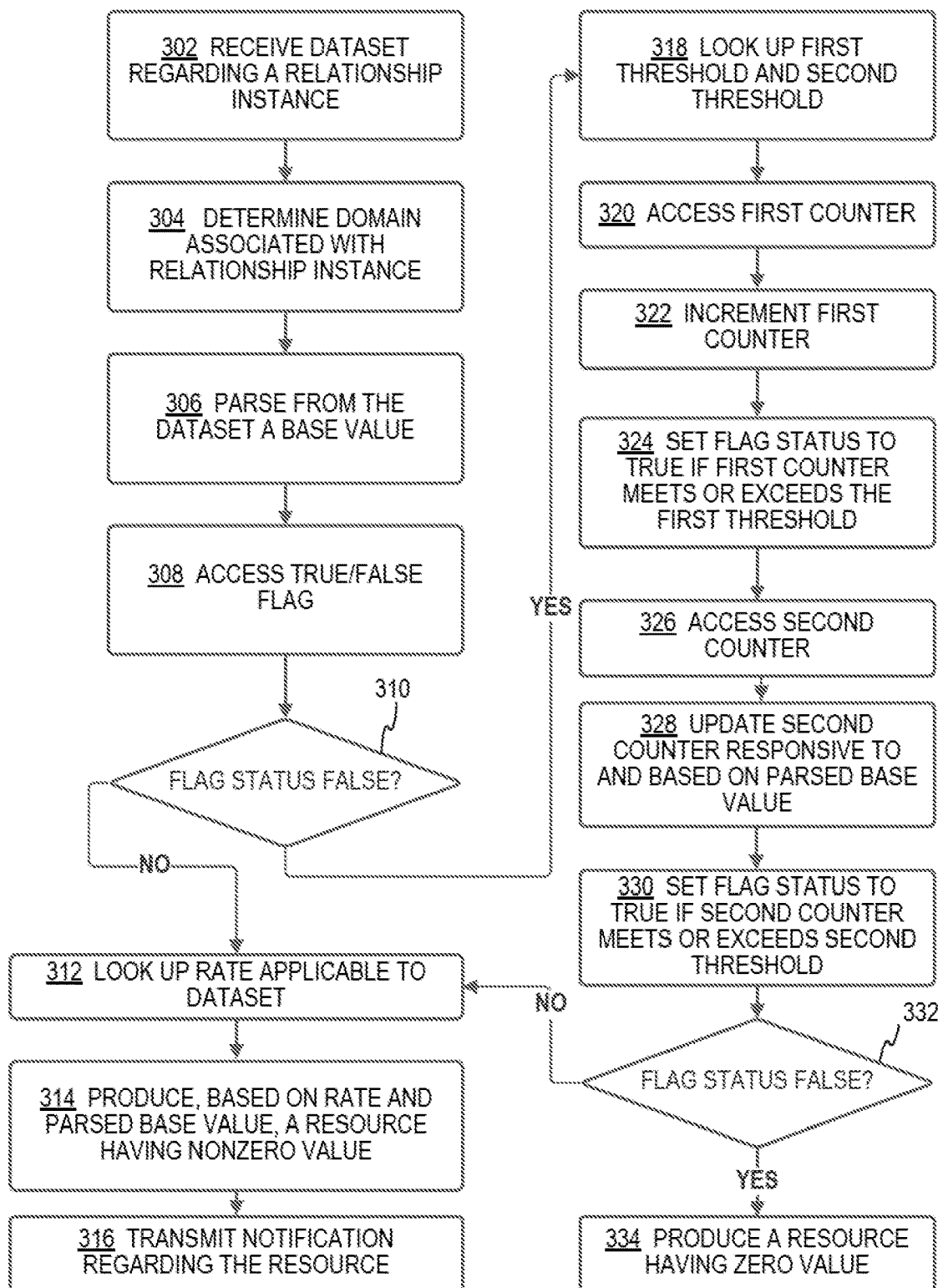
FIG. 3 is a flowchart for illustrating a sample method for automatically producing a resource based on a threshold being crossed, according to embodiments of the present disclosure, which is an improvement in automated computerized systems.

FIG. 3 is a flowchart for illustrating a sample method 300 for automatically producing a resource based on a threshold being crossed, according to embodiments of the present disclosure, which is an improvement in automated computerized systems.

Although, in the present example, the operations and methods described with reference to the flowcharts illustrated in FIGS. 3, 4, 6-8 and 12 are described as being performed by the OSP 198, in various embodiments, one or more of the operations and methods described with reference to the flowcharts illustrated in FIGS. 3, 4, 6-8 and 12 or otherwise described herein may be performed by the client computer system 190 of client 193.

At 302 the OSP 198 receives a dataset on behalf of a primary entity, in which the dataset includes data regarding a relationship instance associated with the primary entity.

At 304 the OSP 198 determines a domain associated with the relationship instance.

At 306, the OSP 198 parses from the dataset a base value associated with the dataset.

At 308, the OSP accesses an electronic true/false flag associated with the primary entity and with the domain.

At 310, the OSP 198 checks a flag status of the true/false flag. If the flag status is false, the method proceeds to 318. If the flag status is true, the method proceeds to 312. Also, in response to the flag status being set from false to true, the OSP 198 may transmit a notification to a computer system of the domain regarding a registration for the client with the domain for remitting resources for relationship instances associated with the domain.

At 312, the OSP 198 looks up a rate applicable to the dataset based on the domain.

At 314, the OSP 198 produces, based on the rate and the parsed base value, a resource having a nonzero value and that is associated with the relationship instance. In some embodiments, setting the flag status occurs after the producing the resource. In some embodiments, setting the flag status occurs before the producing the resource and the flag status is rechecked before the producing the resource.

At 316, the OSP 198 transmits a notification regarding the resource associated with relationship instance.

At 318, the OSP 198 looks up a first threshold associated with the domain and a second threshold associated with the domain. On various embodiments, the first threshold and the second threshold are defined by one or more digital rules about relationship instances associated with the domain.

At 320, the OSP 198 accesses a first counter associated with the primary entity and the domain.

At 322, the OSP 198 increments the first counter responsive to receiving the dataset. In some embodiments, the OSP 198 determine whether one or more digital rules about relationship instances associated with the domain indicate to not count a relationship instance for purposes of determining whether the first counter meets or exceeds the first threshold if an exemption is associated with the relationship instance. In such embodiments, the OSP 198 determines whether an exemption is associated with the relationship instance and the incrementing the first counter is based on a determination that there is not an exemption associated with the relationship instance.

At 324, the OSP 198 sets the flag status to true if the first counter meets or exceeds the first threshold after the incrementing.

At 326, the OSP 198 accesses a second counter representing a present base value associated with the primary entity and the domain. The OSP 198 may parse from the dataset an identity of the primary entity and the domain associated with the relationship instance for the accessing of the first counter and the second counter.

At 328, the OSP 198 updates the second counter responsive to and based on the parsed base value. In some embodiments, the OSP 198 may re-set one or more of the first counter and the second counter based on a period of time that has passed since a selectable calendar date. The OSP 198 may look up the selectable calendar date from a stored memory entry.

At 330, the OSP 198 sets the flag status to true if the second counter meets or exceeds the second threshold after updating the second counter. Also, in some embodiments, the OSP 198 may determine, according to a warning criterion, that the first counter is approaching the first threshold or that the second counter is approaching the second threshold. In such embodiments, the OSP 198 may then transmit a warning notification to a client system associated with the primary entity responsive to thus determining according to the warning criterion.

At 332, the OSP 198 checks a flag status of the true/false flag. If the flag status is false, the method proceeds to 334. If the flag status is true, the method proceeds to 312.

At 334, the OSP 198 produces a resource having a zero value and that is associated with the relationship instance. In some embodiments, setting the flag status occurs after the producing the resource. In other embodiments, setting the flag status occurs before the producing the resource and the flag status is rechecked before the producing the resource. Also, in some embodiments, the OSP 198 may provide and receive an option setting from the primary entity before determining the domain of the relationship instance. In such embodiments, the flag status is thus set only if the option setting has been thus received, else the flag status is not thus set if the option setting has not been thus received.

The OSP 198 may receive a plurality of additional datasets on behalf of the primary entity. Each dataset of the plurality of additional datasets includes data regarding a respective additional relationship instance associated with the primary entity and with a respective additional domain associated with the respective additional relationship instance. For each of the additional datasets, the OSP 198 processes the additional datasets and produces additional respective resources based thereon in the manner described herein regarding method 300.

Figure 4:
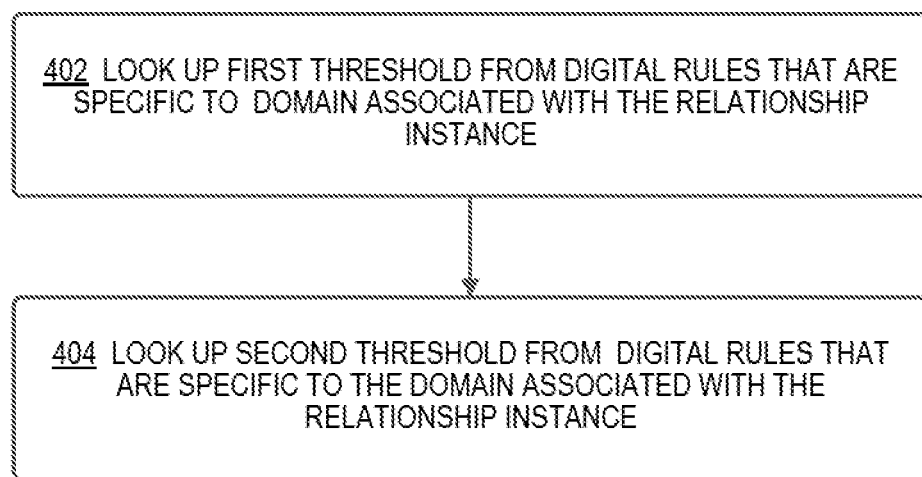
FIG. 4 is a flowchart for illustrating a sample method for looking up a first threshold associated with a domain and a second threshold associated with a domain that is useful in the method of FIG. 3, according to embodiments of the present disclosure, which is an improvement in automated computerized systems.

FIG. 4 is a flowchart for illustrating a sample method 400 for looking up a first threshold associated with the domain and a second threshold associated with the domain that is useful in the method 300 of FIG. 3, according to embodiments of the present disclosure, which is an improvement in automated computerized systems.

At 402, the OSP 198 looks up the first threshold from digital rules that are specific to the domain associated with the relationship instance.

At 404, the OSP 198 looks up the second threshold from the digital rules that are specific to the domain associated with the relationship instance.

Figure 5:
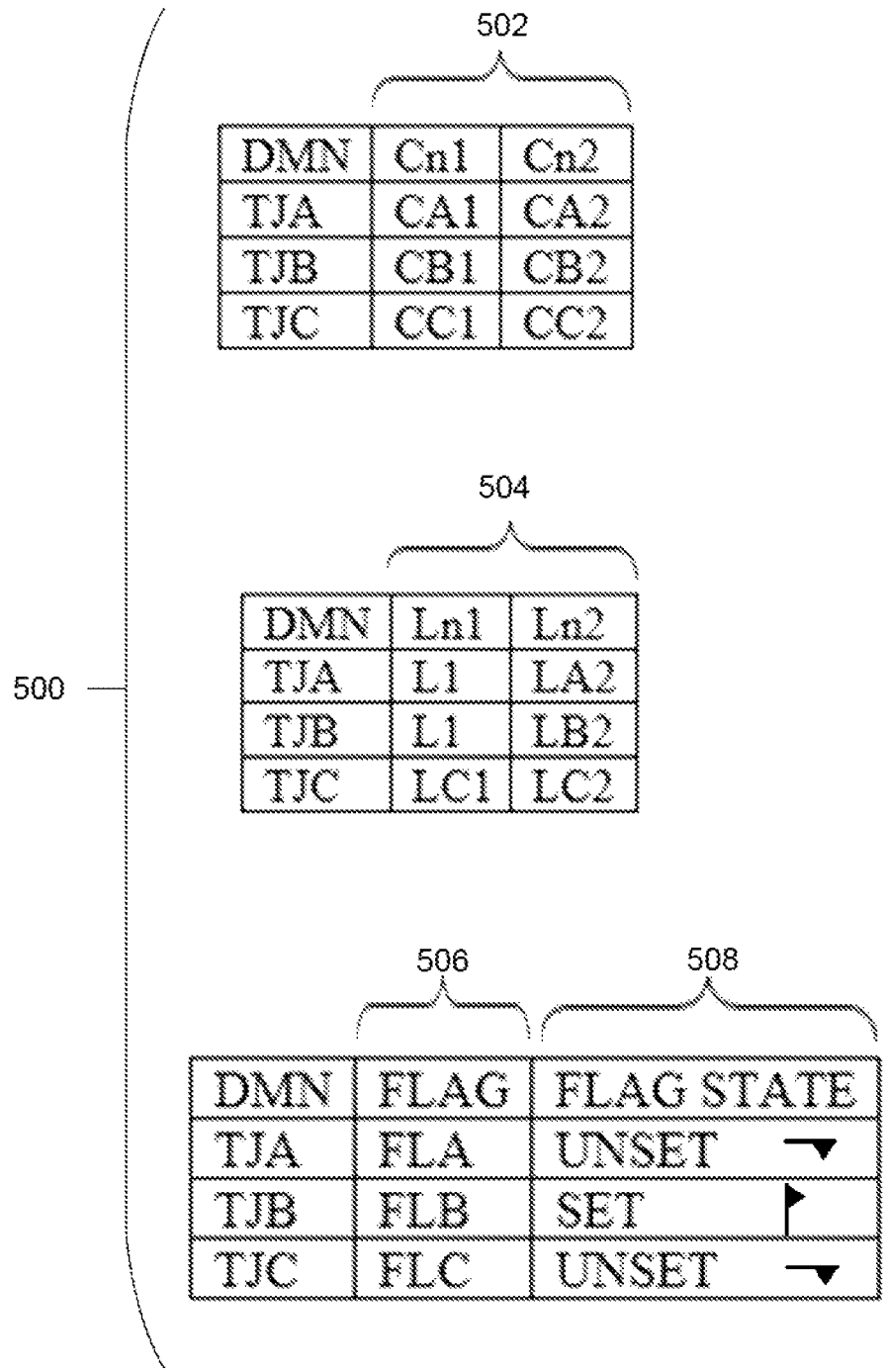
FIG. 5 is a data structure including example values of counters, threshold levels and resulting flag states for a plurality of domains in a system that implements the method for automatically producing a resource based on a threshold being crossed of FIG. 3, according to embodiments of the present disclosure, which is an improvement in automated computerized systems.

FIG. 5 is a data structure 500 including example values of counters, threshold levels and resulting flag states for a plurality of domains in a system that implements the method 300 of FIG. 3 for automatically producing a resource based on a threshold being crossed according to embodiments of the present disclosure, which is an improvement in automated computerized systems. For domain TJA, domain TJB and domain TJC, shown are labels representing values for respective first and second counters 502, labels representing values for respective threshold levels 504, identifiers for respective flags 506 and the flag state 508 of each flag. In the present example embodiment, the flag state 508 of each flag is set based on whether or not the values for respective counters 502 meet or exceed the values for corresponding threshold levels 504.

For example, the flag state 508 of flag FLA for domain TJA is currently unset because first counter value CA1 does not meet or exceed corresponding first threshold level value L1 and second counter value CA2 does not meet or exceed corresponding second threshold level value LA2. However, the flag state 508 of flag FLB for domain TJB is currently set because first counter value CB1 meets or exceeds corresponding first threshold level value L1 or second counter value CB2 meets or exceed corresponding second threshold level value LB2. The flag state 508 of flag FLC for domain TJC is currently unset because first counter value CC1 does not meet or exceed corresponding first threshold level value LC1 and second counter value CC2 does not meet or exceed corresponding second threshold level value LC2. As the method 300 proceeds, datasets for domain TJA, domain TJB and domain TJC are processed and the values of the corresponding counters 502 may change as a result. Thus, the flag state 508 for each domain may change accordingly as each of the respective threshold levels 504 are met or exceeded. There may be fewer or additional domains in various embodiments based on the various domains associated with the datasets being processed.

Figure 6:
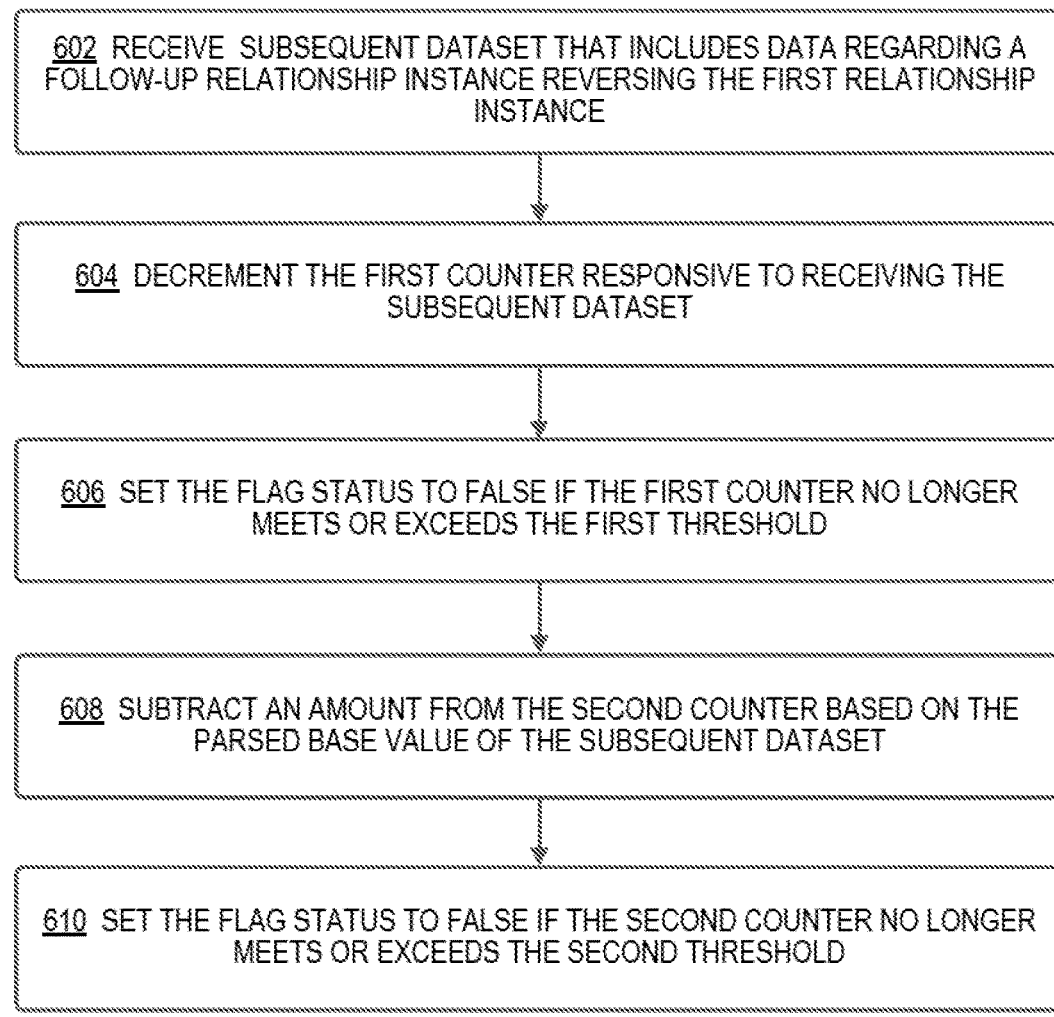
FIG. 6 is a flowchart for illustrating a sample method for updating a counter responsive to and based on a parsed base value of a subsequently received dataset that is useful in the method of FIG. 3, according to embodiments of the present disclosure, which is an improvement in automated computerized systems.

FIG. 6 is a flowchart for illustrating a sample method 600 for updating a counter responsive to and based on a parsed base value of a subsequently received dataset that is useful in the method 300 of FIG. 3, according to embodiments of the present disclosure, which is an improvement in automated computerized systems.

At 602, the OSP 198 receives a subsequent dataset associated with the domain on behalf of the primary entity. The subsequent dataset includes data regarding a follow-up relationship instance associated with the primary entity reversing the first relationship instance.

At 604, the OSP 198 decrements the first counter responsive to receiving the subsequent dataset.

At 606, the OSP 198 sets the flag status to false if the first counter no longer meets or exceeds the first threshold.

At 608, the OSP 198 updates the second counter responsive to and based on a parsed base value of the subsequent dataset. The updating includes subtracting an amount from the second counter based on the parsed base value of the subsequent dataset.

At 610, the OSP 198 sets the flag status to false if the second counter no longer meets or exceeds the second threshold.

Figure 7:
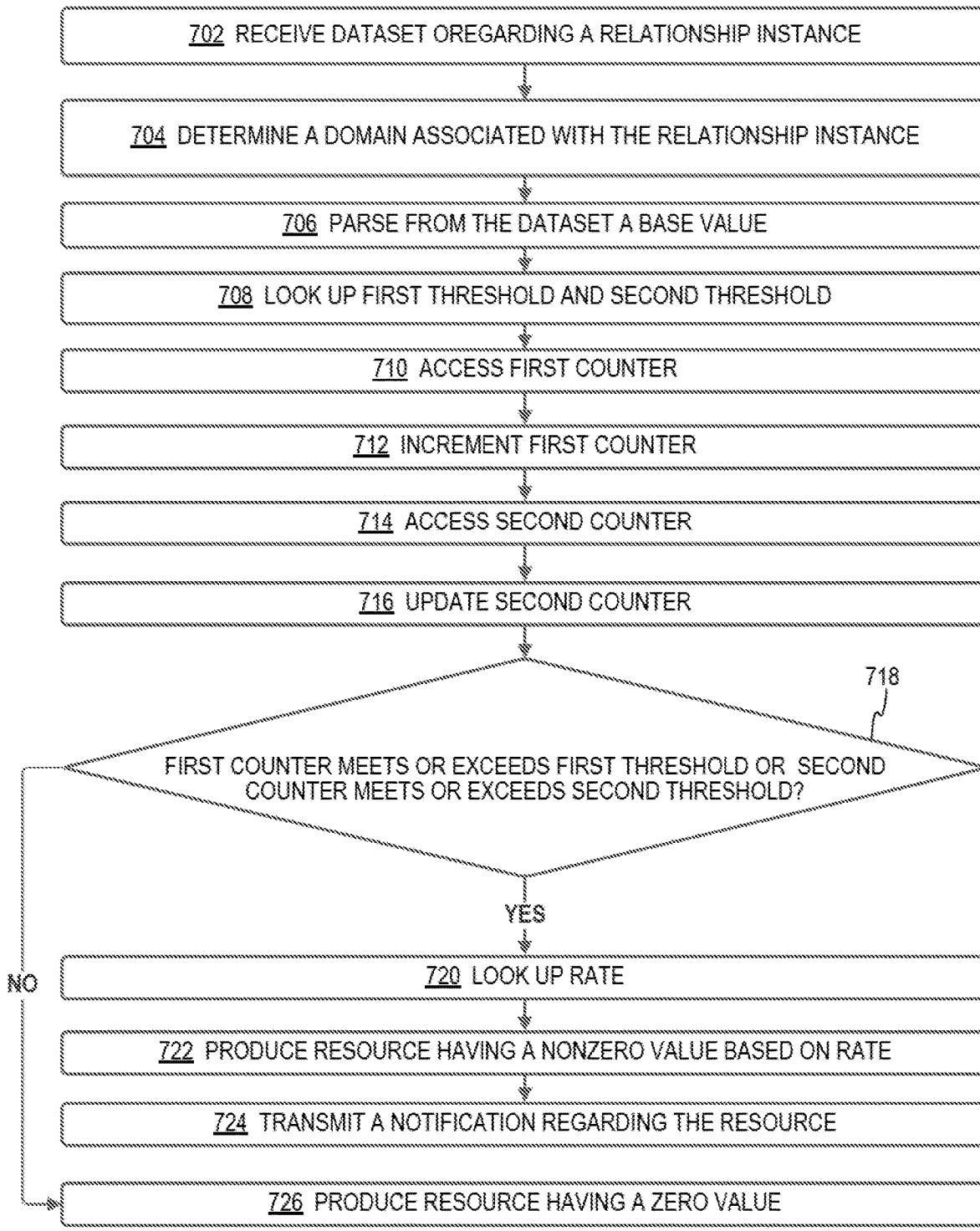
FIG. 7 is a flowchart for illustrating another sample method for automatically producing a resource based on a threshold being crossed, according to embodiments of the present disclosure, which is an improvement in automated computerized systems.

FIG. 7 is a flowchart for illustrating another sample method 700 for automatically producing a resource based on a threshold being crossed, according to embodiments of the present disclosure, which is an improvement in automated computerized systems.

At 702, the OSP 198 receives a dataset on behalf of a primary entity. The dataset includes data regarding a relationship instance associated with the primary entity.

At 704, the OSP 198 determines a domain associated with the relationship instance.

At 706, the OSP 198 parses from the dataset a base value associated with the dataset.

At 708, the OSP 198 looks up a first threshold associated with the domain and a second threshold associated with the domain.

At 710, the OSP 198 accesses a first counter associated with the primary entity and the domain.

At 712, the OSP 198 increments the first counter responsive to receiving the dataset.

At 714, the OSP 198 accesses a second counter representing a present base value associated with the primary entity and the domain.

At 716, the OSP 198 updates the second counter responsive to and based on the parsed base value.

At 718, the OSP 198 determines if one or more of: the first counter meets or exceeds the first threshold and the second counter meets or exceeds the second threshold. If one or more of: the first counter meets or exceeds the first threshold and the second counter meets or exceeds the second threshold, then the method 700 proceeds to 718. In neither the first counter meets or exceeds the first threshold nor the second counter meets or exceeds the second threshold, then the method 700 proceeds to 726.

At 726, the OSP 198 produces a resource having a zero value and that is associated with the relationship instance.

At 720, the OSP 198 looks up a rate applicable to the dataset based on the domain.

At 722, the OSP 198 produces, based on the rate and the parsed base value, a resource having a nonzero value and that is associated with the relationship instance.

At 724, the OSP 198 transmits a notification regarding the resource associated with the relationship instance.

FIG. 8 is a flowchart for illustrating a sample method 800 for handling exemptions that may be is associated with a relationship instance in producing resources based on a threshold being crossed that is useful in the method 700 of FIG. 7, according to embodiments of the present disclosure, which is an improvement in automated computerized systems.

At 802, the OSP 198 determines whether or not one or more digital rules about relationship instances associated with the domain indicate to not count the relationship instance for purposes of determining whether the first counter meets or exceeds the first threshold. For example, one or more digital rules may indicate to not count the relationship instance in cases where an exemption is associated with the relationship instance.

At 804, the OSP 198 determines whether or not an exemption is associated with the relationship instance.

At 806, the OSP 198 increments the first counter based on a determination that there is not an exemption associated with the relationship instance.

Figure 9:
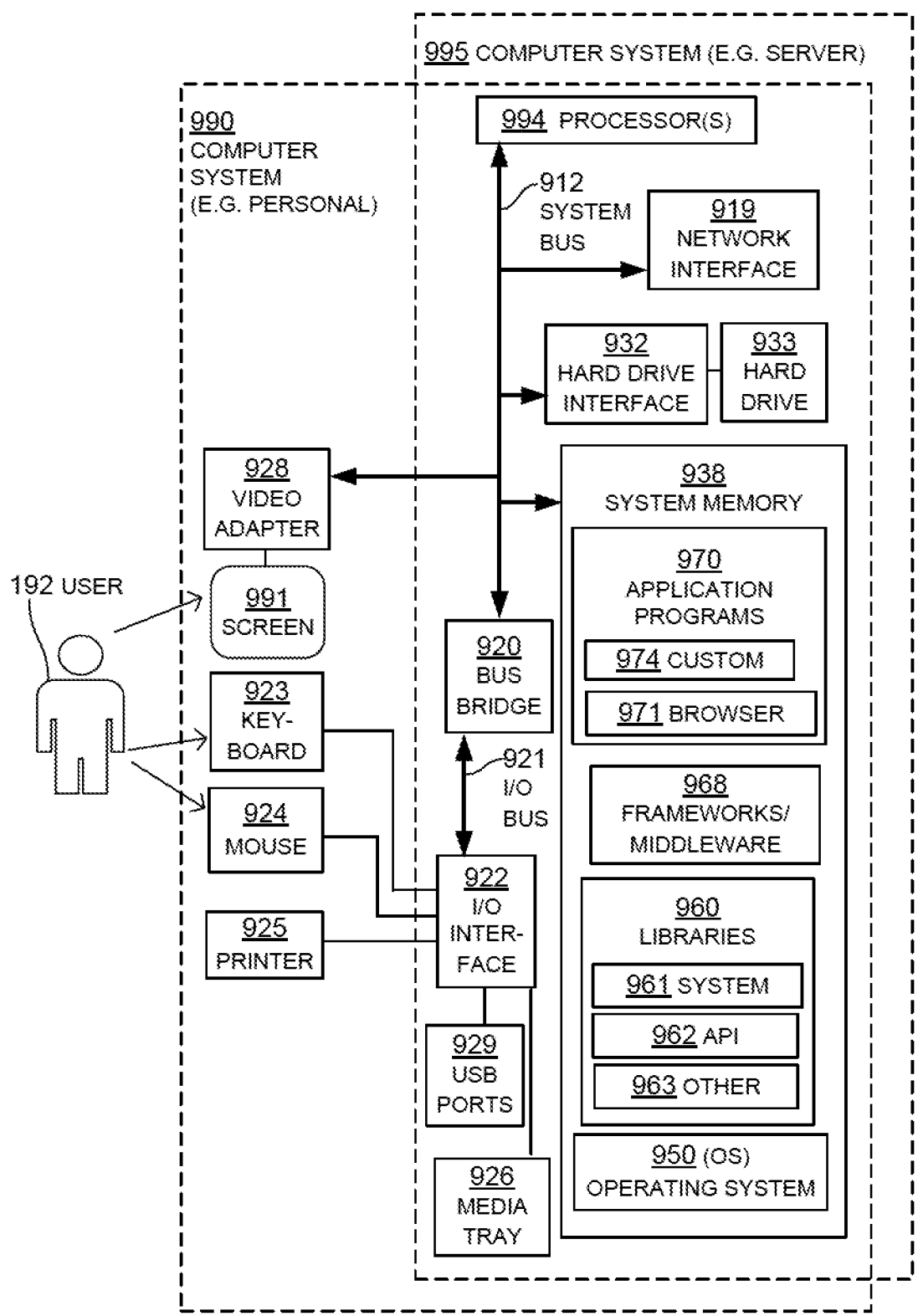
FIG. 9 is a block diagram illustrating components of an exemplary computer system according to some exemplary embodiments, which may read instructions from a machine-readable medium (e.g., a non-transitory computer-readable medium) and perform any one or more of the processes, methods, and/or functionality discussed herein, according to embodiments of the present disclosure, which is an improvement in automated computerized systems.

FIG. 9 is a block diagram illustrating components of an exemplary computer system according to some exemplary embodiments, which may read instructions from a machine-readable medium (e.g., a non-transitory computer-readable medium) and perform any one or more of the processes, methods, and/or functionality discussed herein, according to embodiments of the present disclosure, which is an improvement in automated computerized systems.

In the present example, FIG. 9 is a block diagram illustrating components of a sample computer system 1090 and a sample computer system 995 according to some exemplary embodiments, which may read instructions from a machine-readable medium (e.g., a non-transitory computer-readable medium) and perform any one or more of the processes, methods, and/or functionality discussed herein. The computer system 995 may be a server, while the computer system 1090 may be a personal device, such as a personal computer, a desktop computer, a personal computing device such as a laptop computer, a tablet computer, a mobile phone, and so on. Either type may be used for the computer system 195 and 190 of FIG. 1, a computer system that is part of secondary entity 196 and/or a computer system that is part of any entity or system shown in any of the Figures of the present disclosure.

The computer system 995 and the computer system 1090 have similarities, which FIG. 8 exploits for purposes of economy in this document. It will be understood, however, that a component in the computer system 995 may be implemented differently than the same component in the computer system 1090. For instance, a memory in a server may be larger than a memory in a personal computer, and so on. Similarly, custom application programs 974 that implement embodiments may be different, and so on.

The computer system 995 includes one or more processors 994. The processor(s) 894 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 894 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 995, or the computer system 890, are not intended to be exhaustive. Rather, they are representative, for highlighting essential components that can be used with embodiments.

The computer system 995 also includes a system bus 812 that is coupled to the processor(s) 994. The system bus 912 can be used by the processor(s) 994 to control and/or communicate with other components of the computer system 995.

The computer system 995 additionally includes a network interface 919 that is coupled to system bus 912. Network interface 919 can be used to access a communications network, such as the network 188. Network interface 919 can be implemented by a hardware network interface, such as a Network Interface Card (NIC), wireless communication components, cellular communication components, Near Field Communication (NFC) components, 5G cellular wireless interfaces, transceivers, and antennas, Bluetooth® components such as Bluetooth® Low Energy, Wi-Fi® components, etc. Of course, such a hardware network interface may have its own software, and so on.

The computer system 995 also includes various memory components. These memory components include memory components shown separately in the computer system 995, plus cache memory within the processor(s) 994. Accordingly, these memory components are examples of non-transitory machine-readable media. The memory components shown separately in the computer system 995 are variously coupled, directly or indirectly, with the processor(s) 894. The coupling in this example is via the system bus 912.

Instructions for performing any of the methods or functions described in this document may be stored, completely or partially, within the memory components of the computer system 995, etc. Therefore, one or more of these non-transitory computer-readable media can be configured to store instructions which, when executed by one or more processors 994 of a host computer system such as the computer system 895 or the computer system 890, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 995 include a non-volatile hard drive 933. The computer system 995 further includes a hard drive interface 932 that is coupled to the hard drive 933 and to the system bus 912.

The memory components of the computer system 995 include a system memory 938. The system memory 938 includes volatile memory including, but not limited to, cache memory, registers and buffers. In embodiments, data from the hard drive 433 populates registers of the volatile memory of the system memory 938.

In some embodiments, the system memory 938 has a software architecture that uses a stack of layers, with each layer providing a particular functionality. In this example the layers include, starting from the bottom, an Operating System (OS) 950, libraries 960, frameworks/middleware 968 and application programs 970, which are also known as applications 970. Other software architectures may include less, more or different layers. For example, a presentation layer may also be included. For another example, some mobile or special purpose operating systems may not provide a frameworks/middleware 968.

The OS 950 may manage hardware resources and provide common services. The libraries 960 provide a common infrastructure that is used by the applications 970 and/or other components and/or layers. The libraries 960 provide functionality that allows other software components to perform tasks more easily than if they interfaced directly with the specific underlying functionality of the OS 950. The libraries 960 may include system libraries 961, such as a C standard library. The system libraries 961 may provide functions such as memory allocation functions, string manipulation functions, mathematical functions, and the like.

In addition, the libraries 960 may include API libraries 962 and other libraries 963, such as for SDKs. The API libraries 962 may include media libraries, such as libraries to support presentation and manipulation of various media formats such as MPEG4, H.264, MP3, AAC, AMR, JPG, and PNG. The API libraries 962 may also include graphics libraries, for instance an OpenGL framework that may be used to render 2D and 3D in a graphic content on the screen 991. The API libraries 962 may further include database libraries, for instance SQLite, which may support various relational database functions. The API libraries 962 may additionally include web libraries, for instance WebKit, which may support web browsing functionality, and also libraries for applications 970.

The frameworks/middleware 968 may provide a higher-level common infrastructure that may be used by the applications 970 and/or other software components/modules. For example, the frameworks/middleware 968 may provide various Graphic User Interface (GUI) functions, high-level resource management, high-level location services, and so forth. The frameworks/middleware 968 may provide a broad spectrum of other APIs that may be used by the applications 970 and/or other software components/modules, some of which may be specific to the OS 950 or to a platform.

The application programs 970 are also known more simply as applications and apps. One such app is a browser 971, which is a software that can permit the user 1092 to access other devices in the internet, for example while using a Graphic User Interface (GUI). The browser 971 includes program modules and instructions that enable the computer system 995 to exchange network messages with a network, for example using Hypertext Transfer Protocol (HTTP) messaging.

The application programs 970 may include one or more custom applications 974, made according to embodiments. These can be made so as to cause their host computer to perform operations according to embodiments disclosed herein. Of course, when implemented by software, operations according to embodiments disclosed herein may be implemented much faster than may be implemented by a human mind; for example, tens or hundreds of such operations may be performed per second according to embodiments, which is much faster than a human mind can do.

Other such applications 970 may include Enterprise Resource Planning (ERP) application, accounting application, financial applications, accounting applications, payment systems applications, database and office applications, contacts application, a word processing application, a location application, a media application, a messaging application, and so on. Applications 970 may be developed for the Windows™ operating system, and/or by using the ANDROID™ or IOS™ Software Development Kit (SDK) by an entity other than the vendor of the particular platform, and may be mobile software running on a mobile operating system such as IOS™, ANDROID™, WINDOWS® Phone, or other mobile operating systems. The applications 970 may use built-in functions of the OS 950, of the libraries 460, and of the frameworks/middleware 968 to create user interfaces for the user 1092 to interact with.

The computer system 995 moreover includes a bus bridge 920 coupled to the system bus 912. The computer system 995 furthermore includes an input/output (I/O) bus 921 coupled to the bus bridge 920. The computer system 995 also includes an I/O interface 922 coupled to the I/O bus 921.

For being accessed, the computer system 995 also includes one or more Universal Serial Bus (USB) ports 929. These can be coupled to the I/O interface 922. The computer system 995 further includes a media tray 926, which may include storage devices such as CD-ROM drives, multimedia interfaces, and so on.

The computer system 990 may include many components similar to those of the computer system 995, as seen in FIG. 9. In addition, a number of the application programs may be more suitable for the computer system 990 than for the computer system 995.

The computer system 990 further includes peripheral input/output (I/O) devices for being accessed by a user 192 more routinely. As such, the computer system 990 includes a screen 991 and a video adapter 928 to drive and/or support the screen 991. The video adapter 928 is coupled to the system bus 912.

The computer system 990 also includes a keyboard 923, mouse 924, and a printer 925. In this example, the keyboard 923, the mouse 924, and the printer 925 are directly coupled to the I/O interface 922. Sometimes this coupling is wireless or may be via the USB ports 929.

In this context, "machine-readable medium" refers to a component, device or other tangible media able to store instructions and data temporarily or permanently and may include, but is not be limited to: a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable digital versatile disc (DVD), an optical storage device, a magnetic storage device, or any suitable combination of the foregoing. The machine that would read such a medium includes one or more processors 994.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general or otherwise generic, non-programmed machine into a specialized particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples—Use Cases

Figure 10:
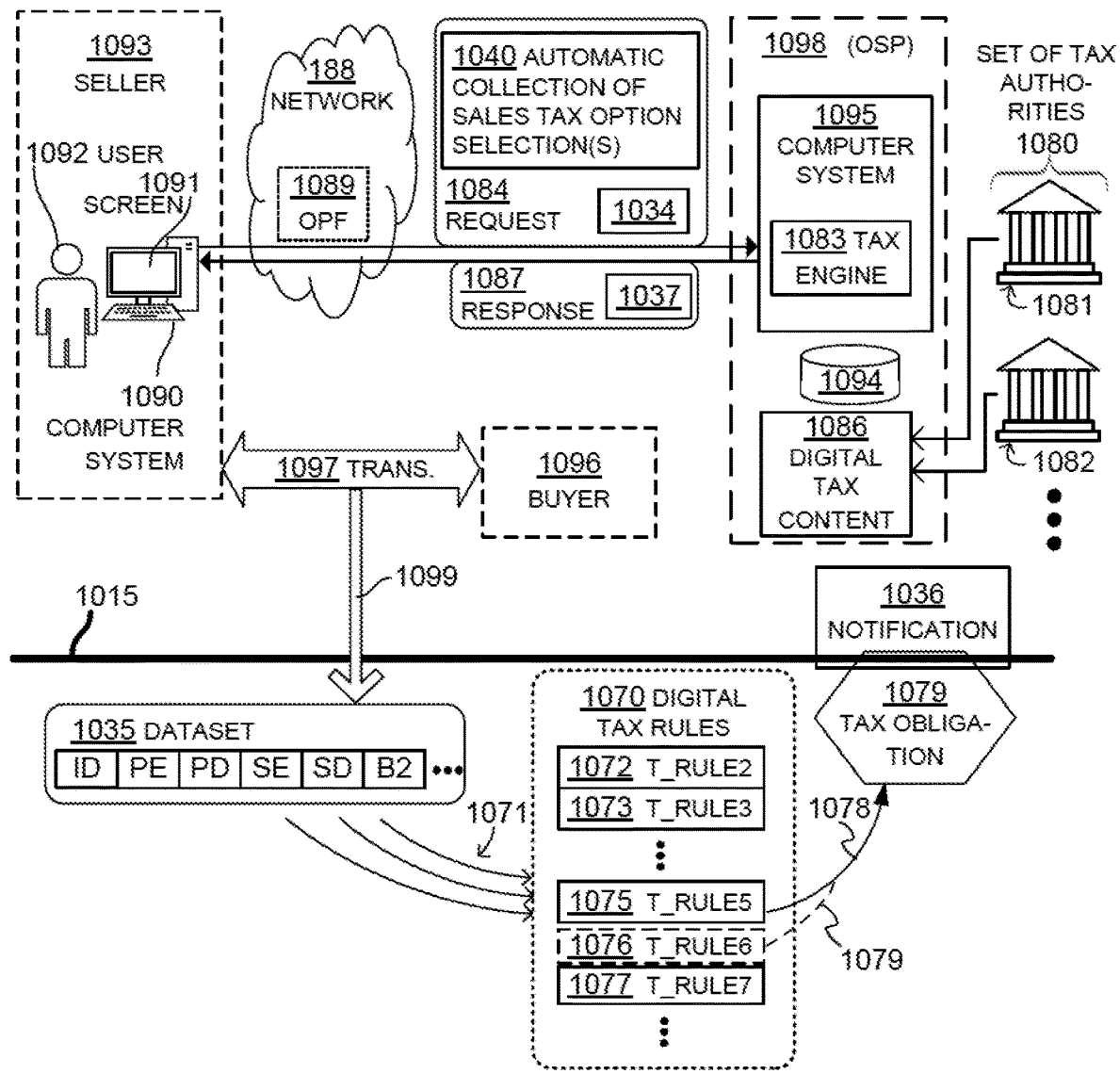
FIG. 10 is a diagram of sample aspects for describing operational examples and use cases of embodiments, according to embodiments of the present disclosure, which is an improvement in automated computerized systems.

The above-mentioned embodiments have one or more uses. Aspects presented below may be implemented as was described above for similar aspects. (Some, but not all, of these aspects have even similar reference numerals.) FIG. 10 is a diagram of sample aspects for describing operational examples and use cases of embodiments, according to embodiments of the present disclosure.

As a sample use case, statutes, tax rules, and rates change often, and new tax rules and tax types are continuously added. The OSP 1098 researches the underlying statutes and tax rules and guidance issued by the tax authorities 1080, uses them to generate or obtain digital tax rules 1070 to compute tax obligations (also referred to herein as tax liabilities) for clients, such as seller 1093, and makes the research available to all its clients. In addition, the OSP 1098 will keep enhancing its coverage of transaction compliance scenarios by enhancing its content and by building logic to determine increasing numbers of different types of compliance liabilities (e.g. tax types) required to be collected and paid to governing authorities, such as tax authorities 1080. Clients trust the OSP 1098 for compliance and may expect the OSP 1098 to take an increasing amount of compliance burden away from their shoulders. However, with more than 10,000 tax jurisdictions in USA alone, it is a mammoth task to stay on top of these changes. For example, different tax jurisdictions have different rules for when a seller is required to collect and remit sales tax. A tax authority such as a state or even a city may set its own economic nexus rules for when a business is considered to be "engaged in business" with it, and therefore that business is subject to registration and collection of sales taxes. These nexus rules are often based on thresholds indicating a total number of sales transactions and/or a total monetary value of all sales in a given time period. It is a technical challenge for a business, such as seller 1093, to constantly ascertain whether it meets these nexus different requirements in different tax jurisdictions in real time as transactions occur given the everchanging amount of sales in various different tax jurisdictions for the business in various time periods.

Thus, embodiments of OSP 1098 enable the option for the seller 1093 to choose/set in advance via an automatic collection of sales tax option selection 1040 for the tax engine 1083 of the OSP 1098 to detect exactly when an economic nexus threshold is crossed based on digital tax rules 1070. In embodiments, the OSP 1098 processes incoming transaction data represented by dataset 1035 of sellers, such as seller 1098 and counts them towards the economic nexus thresholds indicated by the digital tax rules 1070. Upon detecting when an economic nexus threshold is crossed based, the OSP 108 may automatically start determining the tax obligation 1079 for transactions and start assessing sales tax immediately, and/or automatically initiate registration for the seller 1098 with one or more tax authorities in the set of tax authorities 1080, and/or send notifications, such as notification 1079, regarding the economic nexus threshold being crossed. The OSP 1098 can do all this always, or only upon prior request by the seller 1098, e.g., per advance settings, at time of on-boarding for services with the OSP 1098 or later.

Accordingly, at the exact time that the seller 1098 will start owing sales tax, such will start being collected for them by the OSP 1098. The seller 1098 will not be distracted by a notification of upcoming nexus, nor will they be burdened in having to do anything about the notification. Using the system described herein, the seller 1098 will not find out late about crossing the threshold, with the heartache about passing up income, or have misguided temptations about flouting their obligations.

The OSP 1098 can further detect when economic nexus ends by applying digital tax rules 1070. Upon so detecting, the OSP 1098 can send notifications, such as notification 1036, and/or automatically stop assessing sales tax, and/or automatically initiate registration for the seller 1093 with the department of revenue of the applicable tax authority, such as tax authority 1081. The OSP 1098 can do this always, or only upon prior request by the seller 1098, e.g. per advance settings via an automatic collection of sales tax option selection 1040, at time of on-boarding or later.

In deciding for which jurisdictions to count for economic nexus, the OSP 1098 may determine whether nexus has been reached by some other way, and start collecting sales tax there anyway. Upon on-boarding, and optionally periodically thereafter, the seller 1093 may "study"/evaluate where they have nexus already.

In the counting the transactions towards the threshold, the OSP 1093 may further adjust: not counting sales for which there are exemption certificates, if the digital rules associated with the applicable tax authority 1081 indicates they do not count them, and/or not incrementing a counter towards the economic nexus threshold for exempt sales transactions, if the digital rules associated with the applicable tax authority 1081 indicates they do not count them.

In some embodiments, the above is performed, and based on monitoring of transaction volume and total value for seller 1093, sales tax starts being owed starting with a particular transaction, or sales tax may also be owed on a number of previous transactions. For example, sales tax may start being owed from the 201st transaction on, alone, or from the 201st transaction on, plus on the first 200 transactions. This can be looked up by the digital rules 1070 rules (yes/no to the first 200), and notification 1079 may be sent regarding the tax obligation 1079. The OSP 1098 looks up stored rules of the tax jurisdiction (e.g., of tax authority 1082). These rules include the economic nexus thresholds.

In some close cases, in which the seller 1093 is very close to the economic threshold, the seller 1093 may stop selling the item for the remainder of the relevant time period, and re-starts. For example, using information in notification 1036, the seller may decide, based on sales velocity, whether it is worth continuing in the sales period, etc. This calculation whether it is worth continuing in the sales period, etc., may be made by the OSP 1098 based on applicable settings received from the seller 1093 and the digital rules 1070.

Operational examples and sample use cases are possible where the attribute of an entity in a dataset is any one of: the entity's name; type of entity; a physical location such as an address; a contact information element; transactions of the entity; an identifier of a specific source of revenue received for a transaction of the entity; characteristics of transactions of the entity; licensure and/or or registration of the entity and/or products or services the entity produces, sells, stores and/or transfers; products or services produced, sold, stored and/or transferred by the entity; types of products or services produced, sold, stored and/or transferred by the entity; a location to which products are sent, shipped or transferred; a location from which products are received; a location of a property owned by the entity; a location of a property owned by the entity within a particular region of other domain; an affiliation; a characterization of another entity; a characterization by another entity; an association or relationship with another entity (general or specific instances); an asset of the entity; a declaration by or on behalf of the entity; and so on. Different resources may be produced in such instances, and so on.

In particular, FIG. 10 is diagram for an operational example and use case where the resource 1079 includes a tax obligation of a primary entity, such as seller of goods or services 1093 and/or a secondary entity, such as buyer 1096 of goods or services, due to a transaction 1097. It will be recognized that aspects of FIG. 9 have similarities with aspects of FIG. 1. Portions of such aspects may be implemented as described for analogous aspects of FIG. 1. In particular, a thick line 915 separates FIG. 9, although not completely or rigorously, into a top portion and a bottom portion. Above the line 915 the emphasis is mostly on entities, components, their relationships, and their interactions, while below it the emphasis is mostly processing of data that takes place often within one or more of the components above the line 915. Above the line 915, a computer system 1095 is shown, which is used to help clients, such as a seller 1093 and an associated user 1092, with tax compliance. Further in this example, the computer system 1095 is part of an OSP 1098 that is implemented as a Software as a Service (SaaS) provider, for being accessed by the user 1092 online. Alternately, the functionality of the computer system 1095 may be provided locally to a user.

The user 1092 may be standalone. The user 1092 may use a computer system 1090 that has a screen 1091. In embodiments, the user 1092 and the computer system 1090 are considered part of the seller 1093, which is also known as entity 1093. The seller 1093 can be a business, such as a seller of items, a reseller, and so on. The user 1092 can be an employee, a contractor, or otherwise an agent of the entity 1093. In use cases, the seller 1093 and the buyer 1096 are performing the buy-sell transaction 1097. The transaction 1097 will have data that is known to the seller 1093, similarly with what was described by the relationship instance 197 of FIG. 1B.

In a number of instances, the user 1092 and the seller 1093 use software applications to manage their business activities, such as sales, resource management, production, inventory management, delivery, billing, and so on. The user 1092 and/or the seller 1093 may further use accounting applications to manage purchase orders, reservations, bookings, sales invoices, refunds, payroll, accounts payable, accounts receivable, and so on. Such software applications, and more, may be used locally by the user 1092 or from an Online Processing Facility (OPF) 1089 that has been engaged for this purpose by the user 1092, and/or the seller. In such use cases, the OPF 1089 can be a Mobile Payments system, a Point of Sale (POS) system, an Accounting application, an Enterprise Resource Planning (ERP) provider, an e-commerce provider, an electronic marketplace, a Seller Relationship Management (CRM) system, and so on.

Businesses have tax obligations to various tax authorities of respective domains (e.g., respective tax jurisdictions). A first challenge is in making the related determinations. Tax-related determinations, made for the ultimate purpose of tax compliance, are challenging because the underlying statutes and tax rules and guidance issued by the tax authorities are very complex. There are various types of tax, such as sales tax, use tax, excise tax, value-added tax, lodging tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority, such as tax authority 1081 or tax authority 1082 promulgates new tax types of which the seller 1093 is presently unaware.

Tax jurisdictions are defined mainly by geography. Businesses have tax obligations to various tax authorities within the respective tax jurisdictions. There are various tax authorities, such as that of a country, of a state, of a municipality, of a local district such as a local transit district and so on. So, for example, when a business sells items in transactions that can be taxed by a tax authority, the business may have the tax obligations to the tax authority. These obligations include requiring the business to: a) register itself with the tax authority's taxing agency, b) set up internal processes for collecting sales tax in accordance with the sales tax rules of the tax authority, c) maintain records of the sales transactions and of the collected sales tax in the event of a subsequent audit by the taxing agency, d) periodically prepare a form ("tax return") that includes an accurate determination of the amount of the money owed to the tax authority as sales tax because of the sales transactions, e) file the tax return with the tax authority by a deadline determined by the tax authority, and f) pay ("remit") that amount of money to the tax authority. In such cases, the filing and payment frequency and deadlines are determined by the tax authority.

A technical problem for businesses is that the above-mentioned software applications generally cannot provide tax information that is accurate and current enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities—if they cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse. Further, one should note that sales taxes are considered trust-fund taxes, meaning that the management of a company can be held personally liable for the unpaid sales tax.

For sales in particular, making correct determinations for sales and use tax is even more difficult. There are a number of factors that contribute to its complexity.

First, some state and local tax authorities have origin-based tax rules, while others have destination-based tax rules. Accordingly, a sales tax may be charged from the seller's location or from the buyer's location.

Second, the various tax authorities assess different, i.e. non-uniform, percentage rates of the sales price as sales tax, for the purchase and sale of items that involve their various tax jurisdictions. These tax jurisdictions include various states, counties, cities, municipalities, special taxing jurisdictions, and so on. In fact, there are over 10,000 different tax jurisdictions in the US, with many partially overlapping.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is. For example, certain entities are exempt from paying sales tax on their purchases, so long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid.

Fifth, it can be difficult to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical nexus. However, a tax authority such as a state or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

To help with such complex determinations and solve such technical problems, the computer system 1095 may be specialized device for tax compliance as disclosed herein. The computer system 1095 may have one or more processors and memory, for example, as was described for the computer system 195 of FIG. 1. The computer system 1095 thus implements a tax engine 1083 to automatically start determining sales tax obligations on transactions associated with a particular jurisdiction for sellers based on an economic threshold being crossed for a particular tax jurisdiction. The tax engine 1083 can be as described for the service engine 183.

The computer system 1095 may further store locally entity data, i.e. data of user 1092, of entity 1093, any of which/whom may be a seller, and/or a seller or a buyer in a sales transaction in various embodiments. The entity data may include profile data of the seller and transaction data from which a determination of a tax obligation is desired. In the online implementation of FIG. 9, the OSP 1098 has a database 1094 for storing the entity data. This entity data may be inputted by the user 1092, and/or caused to be downloaded or uploaded by the user 1092 from the computer system 1090 or from the OPF 1089, or extracted from the computer system 1090 or from the OPF 1089, and so on. In other implementations, a simpler memory configuration may suffice for storing the entity data.

Digital tax content 1086 is further implemented within the OSP 1098. The digital tax content 1086 can be a utility that stores digital tax rules 1070 for use by the tax engine 1083. As part of managing the digital tax content 1086, there may be continuous updates of the digital tax rules, by inputs gleaned from a set 980 of different tax authorities 1081, 1082, . . . . Updating may be performed by humans, or by computers, and so on. As mentioned above, the number of the different tax authorities in the set 1080 may be very large and the future digital tax rules resulting from tax regulations promulgated by such tax authorities in the set 980, once recognized and stored by the OSP 1098, may be used to determine whether economic nexus thresholds have been met or exceeded and compute such tax obligations based on an automatic collection of sales tax option selection 1040 received from the seller 1093.

For a specific determination of a tax obligation, the computer system 1095 may receive one or more datasets. A sample received dataset 1035 is shown just below line 1015, which can be similar to what was described for the dataset 135 of FIG. 1. In this example, the computer system 1090 transmits a request 1034 that includes a payload 1034, and the dataset 1035 is received by the computer system 1095 parsing the received payload 1034. In this example, the single payload 1034 encodes the entire dataset 1035, but that is not required, as mentioned earlier. The computer system 1090 may also transmit an automatic collection of sales tax option selection 1040 which indicates to the OSP 1098 that the seller 1093 has selected to have the OSP 1098 trigger the tax engine 1083 to automatically start computation and/or collection of sales taxes upon one or more economic thresholds being crossed.

In this example, the dataset 1035 has been received because it is desired to determine any tax obligations arising from the buy-sell transaction 1097. As such, the sample received dataset 1035 has values that characterize attributes of the buy-sell transaction 1097, as indicated by an arrow 1099. (It should be noted that the arrow 1099 describes a correspondence, but not the journey of the data of the buy-sell transaction 1097 in becoming the received dataset 1035.) Accordingly, in this example the sample received dataset 1035 has a value ID for an identity of the dataset 1035 and/or the transaction 1097. The dataset 1035 also has a value PE for the name of the seller 1093 or the user 1092, which can be the seller 1093 making sales transactions, some online. The dataset 1035 further has a value PD for relevant data of the seller 1093 the user 1092, or the transaction, such as calendar year of the transaction, an address, place(s) of business, prior nexus determinations with various tax jurisdictions, and so on. The dataset 1035 also has a value SE for the name of the buyer 1096. The dataset 1035 further has a value SD for relevant data of the buyer 1096, entity-driven exemption status, and so on. The dataset 1035 has a value B2 for the sale price of the item sold.

The dataset 1035 may fewer values or have additional values, as indicated by the dot-dot-dot in the dataset 1035. These values may characterize further attributes, such as characteristics of the item being sold, data identifying of or otherwise relating to a license or registration required for the transaction, a date and possibly also time of the transaction 1097, and so on.

The digital tax rules 970 have been created so as to accommodate tax rules that the set 980 of different tax authorities 981, 1082 . . . promulgate within the boundaries of their tax jurisdictions. In FIG. 5, five sample digital tax rules are shown, namely T_RULE2 1072, T_RULE3 1073, T_RULE5 1075, T_RULE6 1076 and T_RULE7 1077. Additional digital tax rules 1070 are suggested by the vertical dot-dot-dots. Similarly with FIG. 1, some of these digital tax rules may be digital main rules that determine the tax obligation 1079, while others can be digital precedence rules that indicate economic thresholds, determine when economic thresholds are crossed or which of the digital main rules is to be applied in the event of conflict. In some use cases, digital main tax rules may be about a sales tax or use tax being owed due to the transaction 1097 at a certain percentage of the purchase price. Digital precedence rules may be digital tax rules that determine whether particular digital tax rules are to be applied for origin-based or destination-based jurisdictions, how to override for diverse taxability of individual items, for temporary tax holidays, for exemptions from having to pay sales tax based on who the buyer is, and also based on nexus, and so on. In the present example, digital precedence rules may be digital tax rules that determine whether particular digital tax rules are to be applied based on whether economic threshold has been met or exceeded for one or more tax jurisdictions associated with a transaction, such as transaction 1097, and/or based on whether or not the seller has selected to have the OSP 1098 automatically produce one or more tax obligations for the dataset according to whether such economic thresholds have been met or exceeded.

Similarly with FIG. 2, these digital tax rules 970 can be implemented or organized in different ways. In some use cases they can be organized with conditions and consequents, such as was described earlier in this document. Such conditions may relate to geographical boundaries, sources of revenue, effective dates, and so on, for determining where and when a digital tax rule or tax rate is to be applied. These conditions may be expressed as logical conditions with ranges, dates, other data, and so on. Values of the dataset 1035 can be iteratively tested against these logical conditions according to arrows 1071. In such cases, the consequents may indicate one or more economic thresholds and tax obligations, such as to indicate different types of taxes that are due, rules, rates, exemption requirements, reporting requirements, remittance requirements, etc.

In this example, a certain digital tax rule T_RULE5 1075 is shown as identified and used, which is indicated also by the beginning of an arrow 1078. Identifying may be performed responsive to the values of the dataset 1035, which are shown as considered for digital tax rules 1070 by arrows 1071. For example, it can be recognized that a condition of the digital tax rule T_RULE5 1075 is met by one or more of the values of the dataset 1035.

As such, the computer system 1095 may produce the tax obligation 1079 and tax return document, which is akin to producing the resource 179 of FIG. 1. The computer system 1095 may also file or otherwise send (or cause to be filed or sent) the tax return document to one or more of the applicable tax authorities in the set of tax authorities 980 via network 188. The tax obligation 1079 can be produced by the computer system 1095 applying the certain digital tax rule T_RULE5 1075, as indicated by the arrow 978. In this example, the consequent of the identified certain digital tax rule T_RULE5 1075 may specify that an economic threshold has been met or exceeded and thus a sales tax is due for an item, the amount is to be determined by a multiplication of the sale price of the value B2 by a specific rate, the tax return form that needs to be prepared and filed, a date by which it needs to be filed, and so on.

The computer system 1095 may then cause a notification 1036 to be transmitted. The notification 1036 can be about an aspect of the tax obligation 1079, similarly with the notification 136 of FIG. 1. In the example of FIG. 10, the notification 1036 is caused to be transmitted by the computer system 1095 as an answer to the received dataset 1035. The notification 1036 can be about an aspect of the tax obligation 1079. In particular, the notification 1036 may inform about the aspect of the tax obligation 1079, namely that it has been determined, where it can be found, what it is, or at least a portion or a statistic of its content, and so on.

The notification 1036 can be transmitted to one of an output device and another device that can be the remote device, from which the dataset 1035 was received. The output device may be the screen of a local user or a remote user. The notification 1036 may thus cause a desired image to appear on the screen, such as within a Graphical User Interface (GUI) and so on. The other device may be a remote device, as in this example. In particular, the computer system 1095 causes the notification 1036 to be communicated by being encoded as a payload 1037, which is carried by a response 1087. The response 987 may be transmitted via the network 188 responsive to the received request 1084. The response 987 may be transmitted to the computer system 1090, or to OPF 1089, and so on. As such, the other device can be the computer system 1090, a device of the OPF 1089, or the screen 1091 of the user 1092, and so on. In this example the single payload 937 encodes the entire notification 1036, but that is not required, similarly with what is written above about encoding datasets in payloads. Along with the aspect of the tax obligation 1079, it is advantageous to embed in the payload 1037 the ID value, one or more values of the dataset 1035 and/or one or more of the digital tax rules 1070 used to compute the tax obligation 1079. This will help the recipient correlate the response 1087 to the request 984, and therefore match the received aspect of the tax obligation 1079 as the answer to the received dataset 1035.

The OSP 1098 also enables seller 1093 to have the OSP 1098 to automatically start producing one more tax obligations for the dataset 1035 when an economic threshold is met or crossed for the jurisdiction associated with the dataset 1035 based on previous transactions of the seller 1093 associated with that tax jurisdiction. The OSP 1098 may receive a first input, such as automatic collection of sales tax option selection 1040 as part of request 984, indicating whether or not the seller 1093 has selected the first special tax option. In some embodiments, this automatic collection of sales tax option selection 1040 may be received with, in conjunction with, or as part of the payload 934. In some embodiments, the request 184 may include the dataset 1035. However, in the present embodiment, the automatic collection of sales tax option selection 1040 is received before the dataset 1035. In various embodiments, the automatic collection of sales tax option selection 1040 may be received by the OSP 1098 during or after the initial onboarding or subscription of the seller 1093 to the services of the OSP 1098. In some embodiments, the automatic collection of sales tax option selection 1040 having been received by the OSP 1098 is a condition that must be met that is indicated by a digital precedence rule, such as T_RULE3 173, for rule T_RULE6 976 to be applied.

Figure 11:
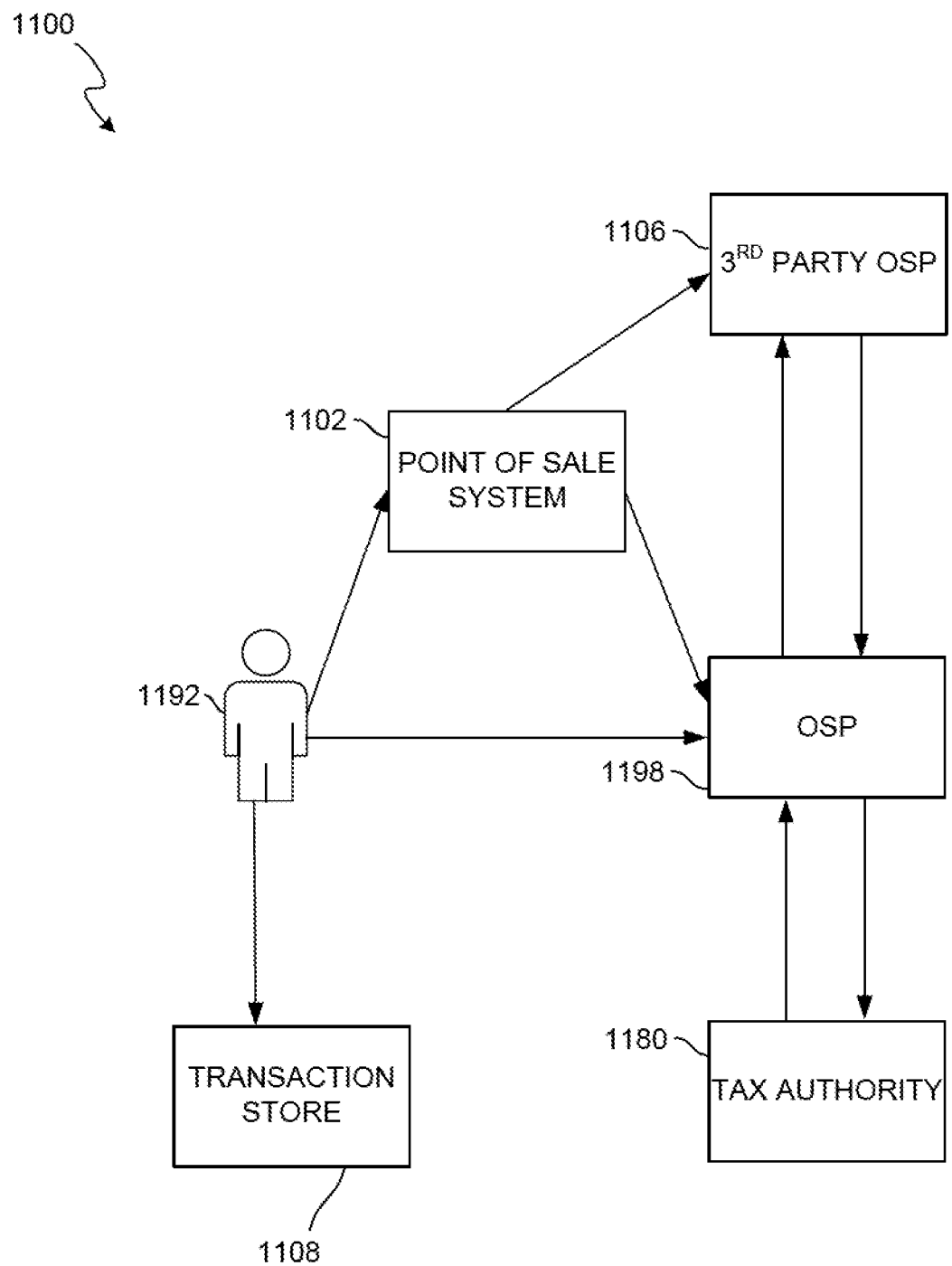
FIG. 11 is a block diagram showing sample components of a system for automatically starting transaction tax computations and enabling collection of transaction tax for transactions upon a threshold for purposes of establishing economic *nexus* in a particular tax jurisdiction being crossed, according to embodiments of the present disclosure, which is an improvement in automated computerized systems.

FIG. 11 is a block diagram showing sample components of a system 1100 for automatically starting transaction tax computations and enabling collection of transaction tax for transactions upon a threshold for purposes of establishing economic nexus in a particular tax jurisdiction being crossed, according to embodiments of the present disclosure, which is an improvement in automated computerized systems.

In some embodiments, the OSP 1198, which may be an example of OSP 1098 of FIG. 10 or OSP 198 of FIG. 1, counts sales transactions towards determining whether an economic threshold of tax authority 1180 has been met or exceeded that other OSPs, such as third party OSP 1106, have processed separately. For example, in various embodiments the OSP 1198 totals the sales transactions of seller 1192 the OSP 1198 has counted itself and the sales transactions the third party OSP 1106 has processed separately. The OSP 1198 then uses this total to determine whether one or more economic thresholds have been met or exceeded. The third party OSP 1106 may be, or may be in operable communication with, a platform of the seller 1192 itself, a point of sale (POS) system 1102 of the seller itself, etc.

The diagram of the system 1100 illustrates how a seller 1192 may initially set up the OSP 1198 by supplying the necessary documents and providing access and consent to have the OSP 1198 pull seller-related information from a different third party OSP 1106. For example, the OSP 1198 may present the authorization to the third party OSP 1106 and subscribes to receive the seller-related transaction data originating from the POS system 1102 and/or the transaction store 1108, or uses the provided access to pull the information periodically from the third party OSP 1106 and/or the POS system 1102. The transaction information may be pulled from the third party OSP 1106 and/or the POS system 1102 as requested, upon a particular number or total value of transactions being processed, and/or according to various other triggers or conditions. The third party OSP 1106 provides the seller transaction information as per the presented authorization and consent.

In an example embodiment, after the initial setup, the seller owned or leased POS equipment of the POS system 1102 transmits transactions of the seller 1192 automatically to the OSP 1198 and/or third party OSP 1106. The seller 1192 may also manually submit the transaction data by pulling it from secondary transactional stores, such as transaction store 1108. The OSP 1198 is provided a complete and comprehensive record of all seller-related transactions and, thus, is enabled to proceed with the calculation of whether the economic nexus thresholds have been met or exceeded. At this point, the documented flow of the method 1200 in FIG. 12 may be performed.

In various embodiments, the OSP 1198 may automatically register or deregister seller 1192 with tax authority 1180 for collection of and remitting transactions taxes in response to a determination by the OSP 1198 of whether or not the transactions of the seller 1192 meet or exceed an economic threshold of the tax authority 1180. The tax authority 1180 may also issue licenses regarding sales of goods or services and the collection of taxes therefor. The registration of the seller 1192, deregistration of the seller 1192 and issuing of licenses may be performed automatically, such as via network API calls between the OSP 1198 and the tax authority 1180 or by manually triggering sending of electronic documents and communications between the OSP 1198 and the tax authority 1180 to do so.

In various embodiments, the communications and data transfers between, and services provided by or to, the various entities in FIG. 11, may be performed via network API calls, such as over network 188 of FIG. 1 and FIG. 10.

Figure 12:
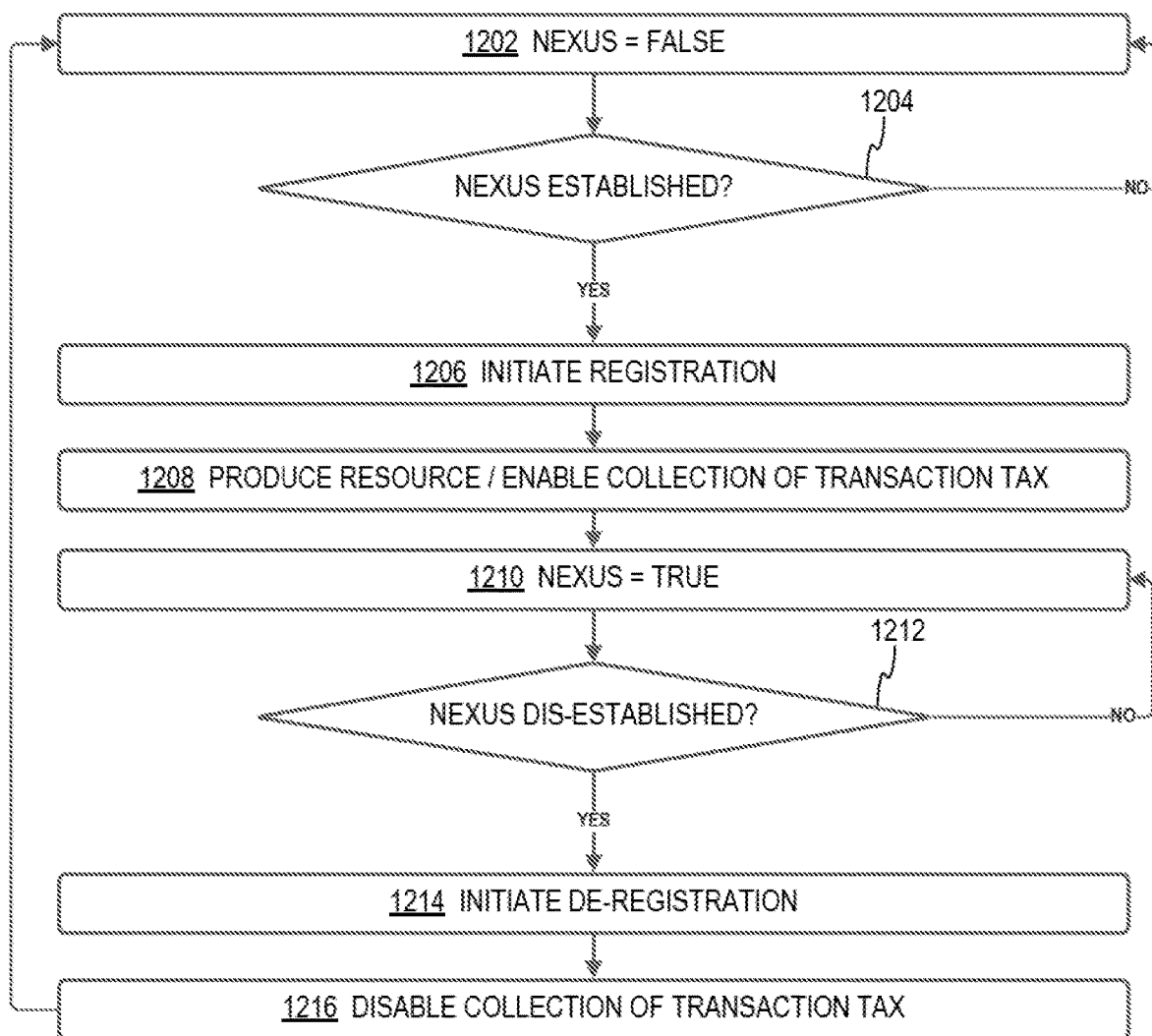
FIG. 12 is a is a flowchart for illustrating a sample method for automatically starting transaction tax computations for transactions and enabling collection of transaction tax for transactions upon a threshold for purposes of establishing economic *nexus* in a particular tax jurisdiction being crossed, according to embodiments of the present disclosure, which is an improvement in automated computerized systems.

FIG. 12 is a is a flowchart for illustrating a sample method 1200 for automatically starting transaction tax computations for transactions and enabling collection of transaction tax for transactions upon a threshold for purposes of establishing economic nexus in a particular tax jurisdiction being crossed, according to embodiments of the present disclosure, which is an improvement in automated computerized systems. For example, in various embodiments, the method 1200 may be performed by the OSP 1198 of FIG. 12, the OSP 1098 of FIG. 10 and/or the OSP 198 of FIG. 1. In the present example, the method 1200 is performed by the OSP 1198 of FIG. 12.

At 1202, the OSP 1198 has determined that an economic nexus in a particular tax jurisdiction has been not met. For example, this may be indicated by a flag being set to false.

At 1204, the OSP 1198 determines whether or not the economic nexus in the particular tax jurisdiction has been established. For example, this may be by determining whether a threshold for purposes of establishing economic nexus in the particular tax jurisdiction has been met or exceeded. The threshold may indicate, for example, a minimum number of transactions over a particular time period and/or a minimum total value of transactions over the time period. If it is determined by the OSP 1198 that the economic nexus in the particular tax jurisdiction has been met, then the method 1200 proceeds to 1206. If it is determined by the OSP 1198 that the economic nexus in the particular tax jurisdiction has not been established, then the method 1200 proceeds back to 1202. The determination of whether or not the economic nexus in the particular tax jurisdiction has been established may be performed periodically, upon request of the seller 1192, and/or on a per-transaction basis in real-time as each transaction occurs.

At 1206, the OSP 1198 automatically registers seller 1192 with tax authority 1180 for purposes of collection of and remitting transactions taxes.

At 1208, the OSP 1198 produces the applicable resource (e.g., computes the transaction tax obligation for the current transaction, the next transactions going forward and/or a previous number of transactions) and enables collection of the computed transaction tax obligation.

At 1210 the OSP determines that the economic nexus in the particular tax jurisdiction has been met. For example, this may be indicated by the OSP 1198 setting the flag to true.

At 1212, the OSP 1198 determines whether or not the economic nexus in the particular tax jurisdiction has been dis-established. For example, this may be by determining whether a threshold for purposes of establishing economic nexus in the particular tax jurisdiction is no longer met or exceeded. If it is determined by the OSP 1198 that the economic nexus in the particular tax jurisdiction has been dis-established, then the method 1200 proceeds to 1214. If it is determined by the OSP 1198 that the economic nexus in the particular tax jurisdiction has not been dis-established, then the method 1200 proceeds back to 1210. The determination of whether or not the economic nexus in the particular tax jurisdiction has been dis-established may be performed periodically, upon request of the seller 1192, and/or on a per-transaction basis in real-time as each transaction occurs.

At 1214, the OSP 1198 automatically de-registers seller 1192 with tax authority 1180 for purposes of collection of and remitting transactions taxes.

At 1208, the OSP 1198 disables collection of transaction tax for the current transaction and/or the next transactions going forward. The method 1200 then proceeds back to 1202.

FIG. 13 is a listing 1300 of example pseudocode for a sample method for automatically starting transaction tax computations for transactions and enabling collection of transaction tax for transactions upon a threshold for purposes of establishing economic nexus in a particular tax jurisdiction being crossed, according to embodiments of the present disclosure, which is an improvement in automated computerized systems.

According to the listing 1300 of example pseudocode, a program executing according to the pseudocode initializes to zero a counter for the total number transactions of a seller that are associated with a particular domain (e.g., tax jurisdiction) and initializes to zero a counter for the total monetary amount of those transactions. As each dataset for a transaction is received, the program determines, based on the dataset, whether the transaction is associated with the particular domain. If it is not, it is discarded. If it is associated with the particular domain, the counters are updated accordingly.

After the counters are updated, the program checks whether or not the current values of the counters cross the applicable economic thresholds for the particular domain. If either of the thresholds have been crossed, then the program sets a flag to true indicating economic nexus has been established and imitates instructions to register the seller (if not already registered) with the applicable tax authority for collection of and remitting transactions taxes and to compute the applicable resource (e.g., transaction tax) for the transaction.

If neither of the thresholds have been crossed, then the program checks whether a new year has been started. Various different timeframes (months, quarters, fiscal or calendar years, etc.) may be used in different embodiments. If the program determines a new year has been started, the counters are initialized to zero and the next dataset for the next transaction is processed as above. Otherwise, the counters are not initialized to zero and the next dataset for the next transaction is processed as above.

Figure 14:
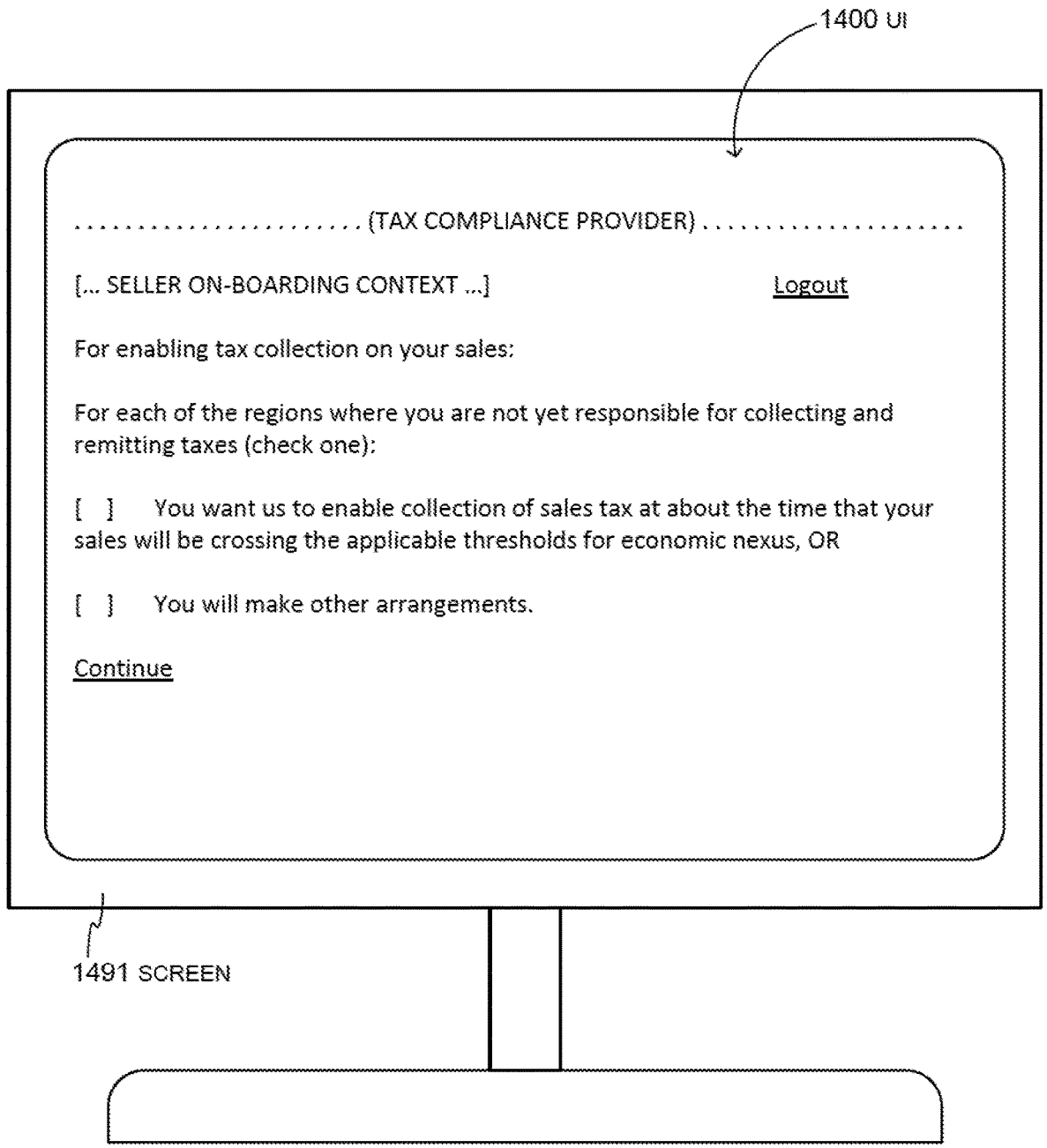
FIG. 14 is a sample view of a User Interface (UI) in which an option is presented for a client to enable automatic collection of sales tax at about the time that the client's sales will be crossing applicable thresholds for economic *nexus*, according to embodiments of the present disclosure, which is an improvement in automated computerized systems.

FIG. 14 is a sample view of a User Interface (UI) 1400 in which an option is presented for a client to enable automatic collection of sales tax at about the time that the client's sales will be crossing applicable thresholds for economic nexus, according to embodiments of the present disclosure, which is an improvement in automated computerized systems.

Shown is UI 1400 presented on a screen 1491 of a device. For example, the screen 1491 may be screen 1091 of the computer system 1090 or other device of the seller 1093 or user 1092 of FIG. 10. Shown in UI 1400 an options that the user 1092 may select to electronically indicate to the OSP 1098 whether or not to automatically start collection of sales tax at about the time that the seller's sales will be crossing applicable thresholds for economic nexus as described herein. For example, UI 1400 may be presented to the user 1092 during the on-boarding of the seller to the OSP 1098 when subscribing to services of the OSP 1098.

Figure 15:
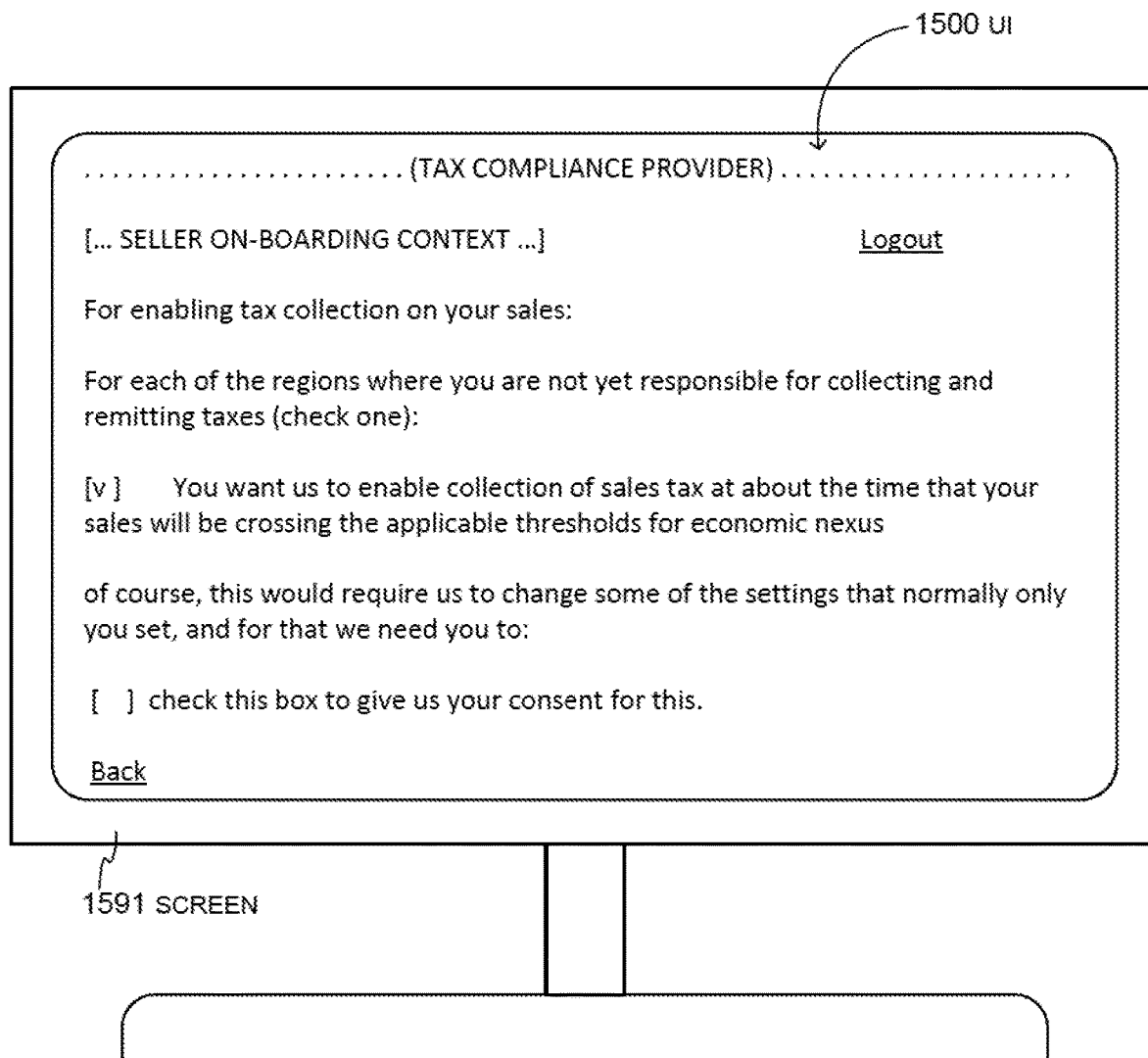
FIG. 15 is a sample view of a User Interface (UI) in which the client has selected an option to enable automatic collection of sales tax at about the time that the client's sales will be crossing applicable thresholds for economic *nexus*, according to embodiments of the present disclosure, which is an improvement in automated computerized systems.

FIG. 15 is a sample view of a User Interface (UI) 1500 in which the client has selected an option to enable automatic collection of sales tax at about the time that the client's sales will be crossing applicable thresholds for economic nexus, according to embodiments of the present disclosure, which is an improvement in automated computerized systems.

Shown is UI 1500 presented on a screen 1591 of a device. For example, the screen 1591 may be screen 1091 of the computer system 1090 or other device of the seller 1093 or user 1092 of FIG. 10. In the present example embodiment, UI 1500 is presented after the user 1092 has selected the option presented in UI 1400 to enable automatic collection of sales tax and selected the "continue" button or link shown in UI 1400. Presented in the UI 1500 is an option the user may then select to give consent to the OSP 1098 to change system settings to enable the OSP 1098 to automatically start collection of sales tax as described herein.

Figure 16:
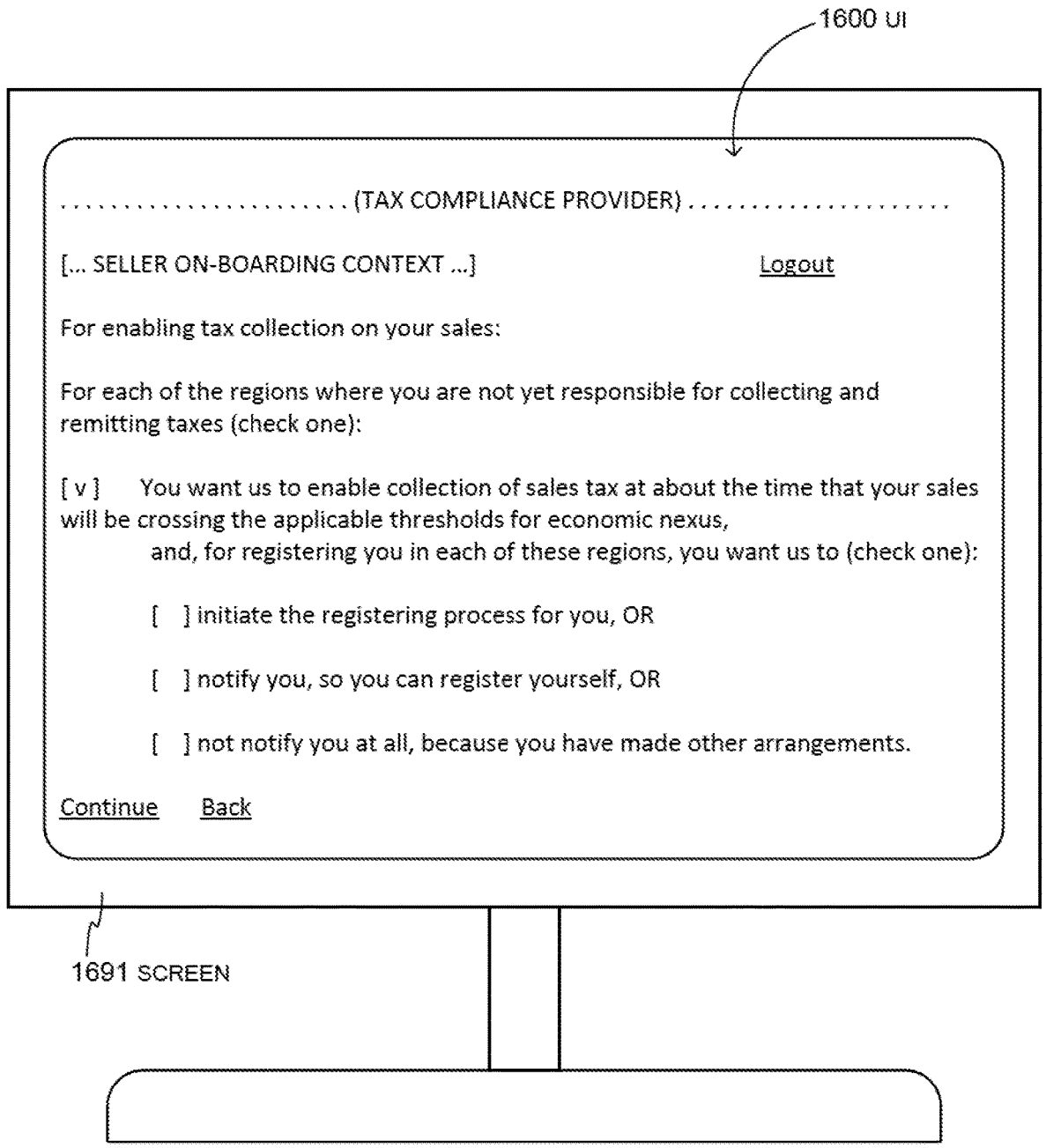
FIG. 16 is a sample view of a User Interface (UI) in which the client has selected an option to enable automatic collection of sales tax at about the time that the client's sales will be crossing applicable thresholds for economic *nexus* and further options are presented for the client regarding registration in tax jurisdictions in which the client's sales will be crossing applicable thresholds for economic *nexus*, according to embodiments of the present disclosure, which is an improvement in automated computerized systems.

FIG. 16 is a sample view of a User Interface (UI) 1600 in which the client has selected an option to enable automatic collection of sales tax at about the time that the client's sales will be crossing applicable thresholds for economic nexus and further options are presented for the client regarding registration in tax jurisdictions in which the client's sales will be crossing applicable thresholds for economic nexus, according to embodiments of the present disclosure, which is an improvement in automated computerized systems.

Shown is UI 1600 presented on a screen 1691 of a device. For example, the screen 1691 may be screen 1091 of the computer system 1090 or other device of the seller 1093 or user 1092 of FIG. 10. In the present example embodiment, the user 1092 may indicate that upon the OSP 1098 detecting the seller 1093 crossing applicable thresholds for economic nexus, to have the OSP 1098 either automatically initiate the registering process for the seller 1093, notify the seller 1093 (so the seller can register themselves), or to not notify the seller 1093 at all.

Figure 17:
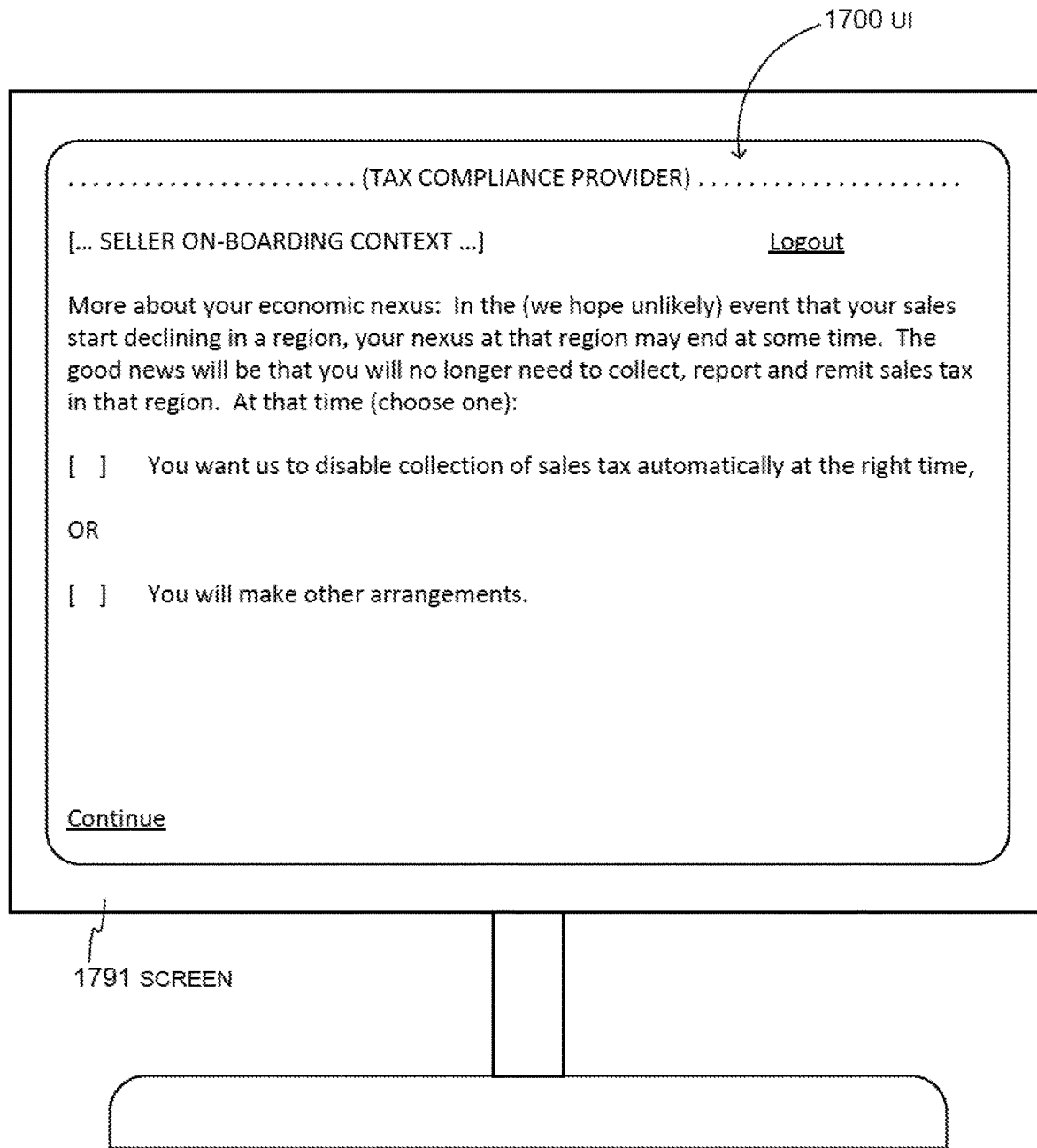
FIG. 17 is a sample view of a User Interface (UI) in which an option is presented for a client to automatically disable collection of sales tax in a particular tax jurisdiction based on the client's economic nexus ending in that tax jurisdiction, according to embodiments of the present disclosure, which is an improvement in automated computerized systems.

FIG. 17 is a sample view of a User Interface (UI) 1700 in which an option is presented for a client to automatically disable collection of sales tax in a particular tax jurisdiction based on the client's economic nexus ending in that tax jurisdiction, according to embodiments of the present disclosure, which is an improvement in automated computerized systems.

Shown is UI 1700 presented on a screen 1791 of a device, for example, after the user selects the "continue" button or link of UI 1600. For example, the screen 1791 may be screen 1091 of the computer system 1090 or other device of the seller 1093 or user 1092 of FIG. 10. In the present example embodiment, the user 1092 may indicate that upon the OSP 1098 detecting the seller 1093 no longer meets the thresholds for economic nexus, whether or not to have the OSP 1098 automatically disable collection of sales tax at the right time for the seller 1093.

Figure 18:
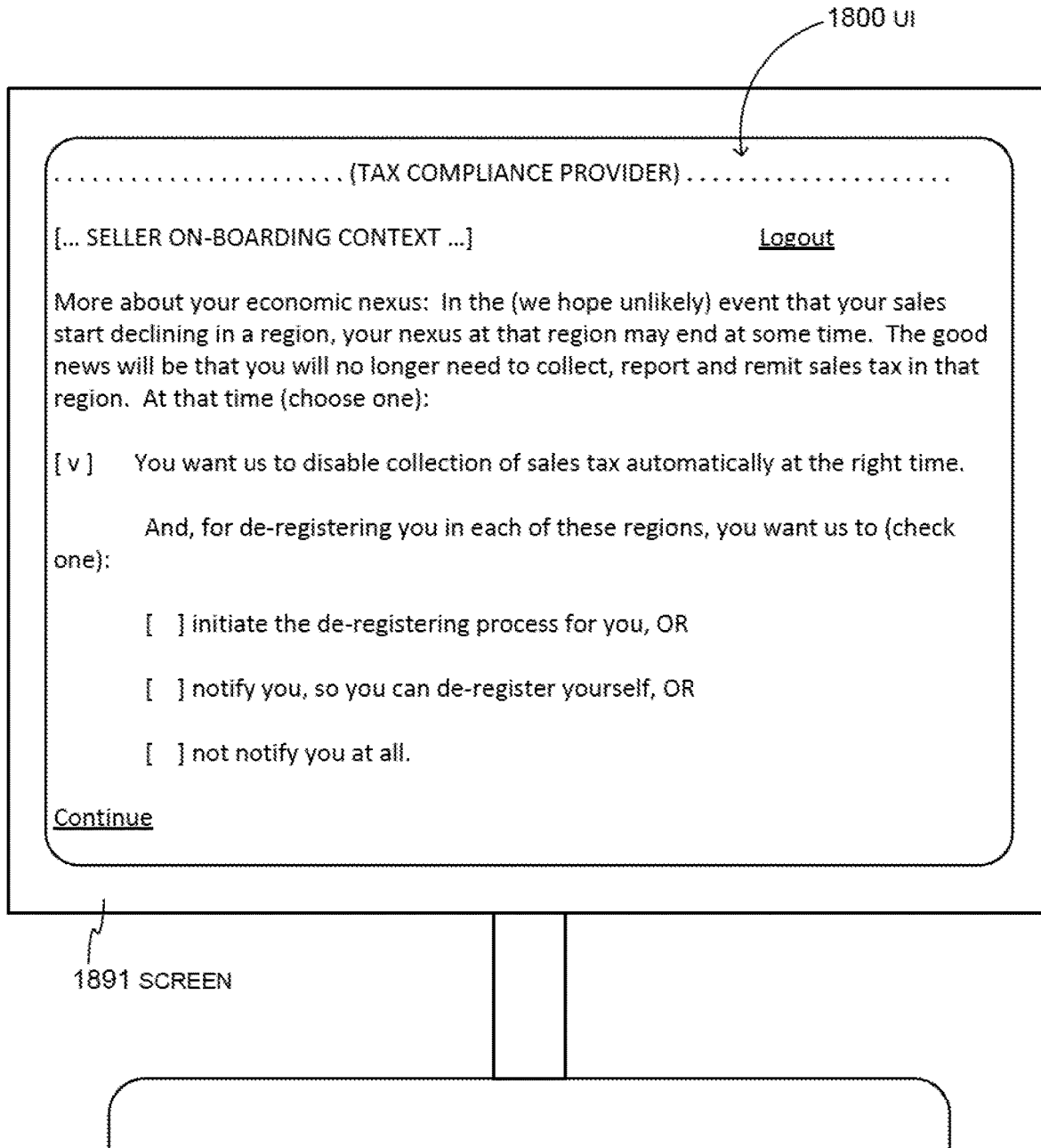
FIG. 18 is a sample view of a User Interface (UI) in which the client has selected an option to automatically disable collection of sales tax in a particular tax jurisdiction based on the client's economic nexus ending in that tax jurisdiction and a further option is presented regarding de-registering the client in the particular tax jurisdiction, according to embodiments of the present disclosure, which is an improvement in automated computerized systems.

FIG. 18 is a sample view of a User Interface (UI) 1800 in which the client as selected an option to automatically disable collection of sales tax in a particular tax jurisdiction based on the client's economic nexus ending in that tax jurisdiction and a further option is presented regarding de-registering the client in the particular tax jurisdiction, according to embodiments of the present disclosure, which is an improvement in automated computerized systems.

Shown is UI 1800 presented on a screen 1891 of a device, for example, after the user selects the "continue" button or link of UI 1700. For example, the screen 1791 may be screen 1091 of the computer system 1090 or other device of the seller 1093 or user 1092 of FIG. 10. In the present example, the user 1092 may select an option to have the OSP 1098 either automatically initiate the de-registering process for the seller 1093, just notify the seller 1093 (so the seller 1093 can de-register themselves), or not notify the seller 1093 at all regarding de-registering.

Figure 19:
FIG. 19 illustrates an example of a plurality of extracted datasets, according to embodiments of the present disclosure, which is an improvement in automated computerized systems.

FIG. 19 illustrates an example of a plurality of extracted datasets 1900, according to embodiments of the present disclosure, which is an improvement in automated computerized systems.

In the embodiment shown in FIG. 19, each dataset represents and includes data corresponding to a transaction of the client entity, such as seller 1093 in FIG. 10, which is a provider of goods or services, and a secondary entity (e.g., a recipient of the goods or services), such as buyer 1096 in FIG. 10. Shown in extracted datasets 1900 are individual values for parameter value ID, which is an identifier of the dataset, parameter value DY, which is, in the present example use case, the calendar year in which the transaction occurred; parameter value BX, which is, in the present example use case, the amount of the transaction; and parameter value ST, which is, in the present example use case, the domain (e.g., state) associated with the transaction. In the present example, the extracted datasets 1900 are sorted (starting on the left, from bottom to top) by the parameter value DY, or calendar year of the transaction. In the present embodiment, this sorting may have been performed by the computer system 1095 of the OSP 1098.

Figure 20:
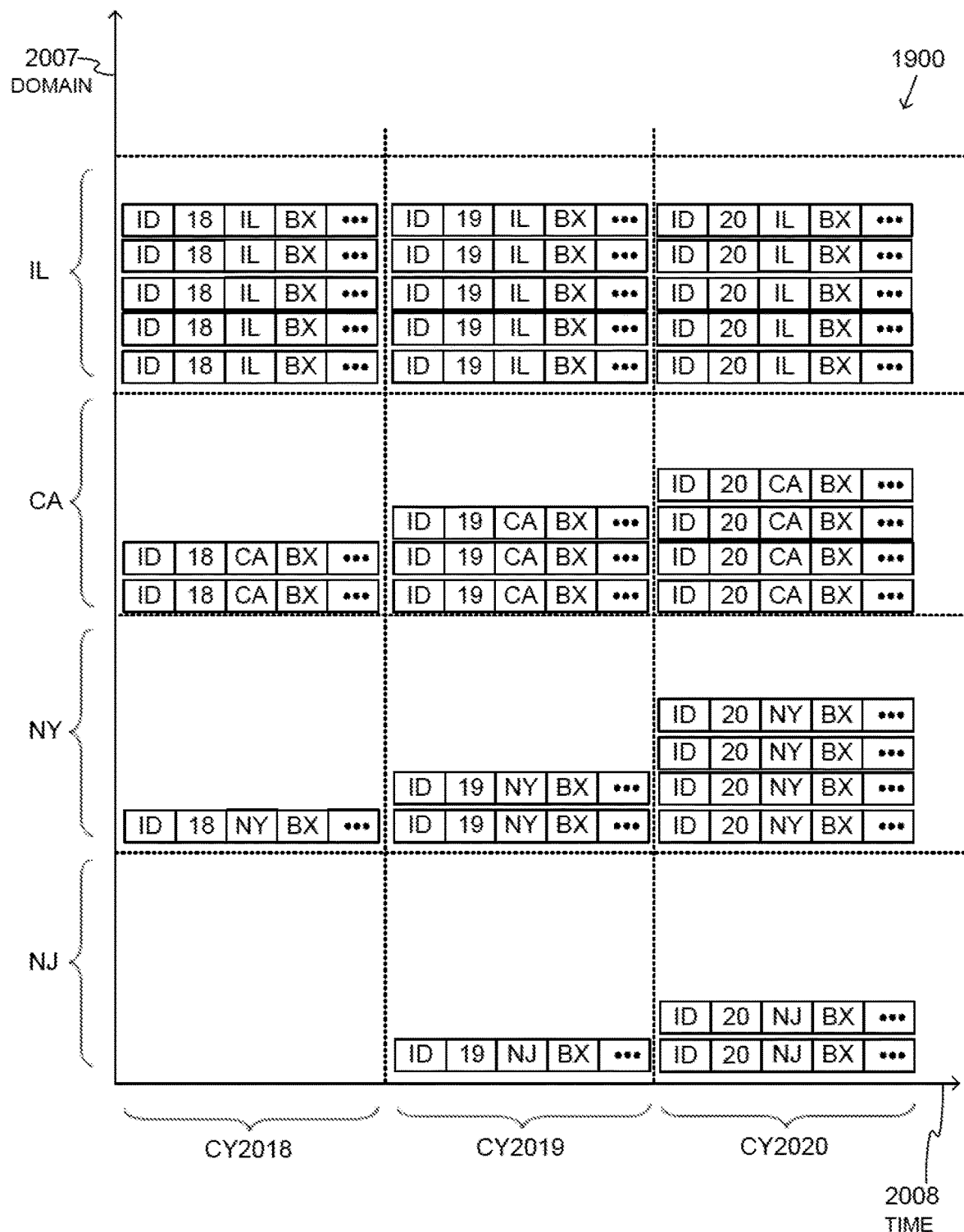
FIG. 20 illustrates the example datasets from FIG. 19 that have been filtered according to various embodiments of the disclosure, which is an improvement in automated computerized systems.

FIG. 20 illustrates the example datasets 1900 from FIG. 19 that have been filtered according to various embodiments of the disclosure, which is an improvement in automated computerized systems.

In some embodiments, the sorting, grouping or otherwise filtering of the datasets of the client data in a particular manner enable or otherwise facilitate the client data to be processed by the OSP 1098 in order to apply one or more digital rules to the copied data to generate a determination regarding whether a threshold for purposes of establishing economic nexus in a particular tax jurisdiction has crossed. The OSP 1098 may then automatically start to compute and initiate collection of applicable transaction taxes for the client (and also register the client in the applicable tax jurisdiction for purposes of collecting and remitting transaction tax in that jurisdiction) in response to a determination that the threshold has been crossed. In the present example, the copied client data is filtered (e.g., by the OSP 1098) such that the datasets are grouped or categorized by the parameter value DY (calendar year of the transaction) and the parameter value ST (domain associated with the transaction).

The datasets 1900 are shown filtered in such a manner within a matrix in which the horizontal axis 2008 of the matrix represents time in terms of the calendar year of the transaction represented by the dataset and the vertical axis 2007 of the matrix represents the domain (e.g., tax jurisdiction) associated with the transaction represented by the dataset. In some embodiments, there may be multiple domains associated with a particular dataset and thus there may be multiple matrices used. Thus, each cell of the matrix contains the datasets for transactions that occurred in a particular year and that are associated with a particular domain. For example, in FIG. 20 there is one cell that contains all the datasets representing all those transactions of the client entity that occurred in 2020 in the state of New Jersey (NJ). As shown in FIG. 20, there are two datasets (representing two respective transactions) in that cell which meet that criteria. As another example, there is one cell that contains all the datasets representing all those transactions of the client entity that occurred in 2019 in the state of California (CA). As shown in FIG. 20, there are three datasets (representing three respective transactions) in that cell.

In some embodiments, the matrix shown in FIG. 20 represents a data structure of the client data as generated, filtered and/or stored by the OSP 1098, or may represent logical relationships between the datasets as a result of the filtering. In some embodiments, such filtering may be performed by a tax engine 1083 of the OSP 1098. In some embodiments, the OSP 1098 may extrapolate from, or interpret the filtered datasets to detect, relevant trends, patterns or other information relevant to the client entity. For example, by filtering the datasets of the copied data, the OSP 1098 may detect a trend that the client entity's sales have flattened in Illinois (IL), and may be approaching falling below a threshold in IL for economic nexus, but the client entity is more recently getting into new markets California (CA), New York (NY) and New Jersey (NJ) and may be approaching crossing one or more thresholds for economic nexus one or more of those states.

Figure 21:
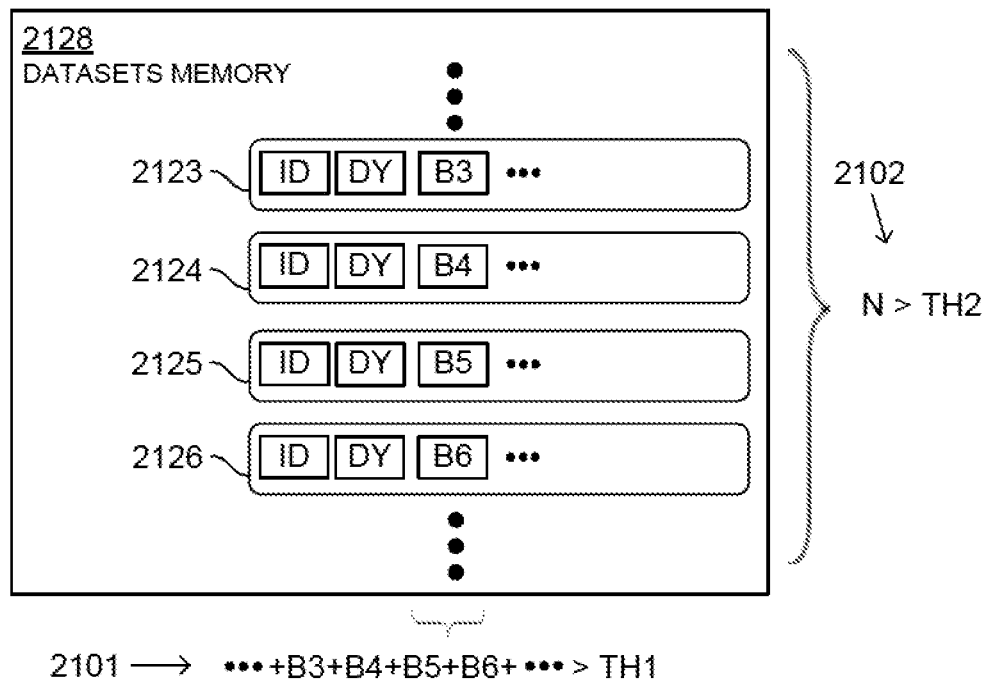
FIG. 21 illustrates an example of application of rules to datasets according to various embodiments of the disclosure, which is an improvement in automated computerized systems.

FIG. 21 illustrates an example of application of rules to datasets according to various embodiments of the disclosure, which is an improvement in automated computerized systems.

The filtering of the datasets of the client data into cells, as described with respect to FIG. 20, in which each cell contains the datasets for transactions that occurred in a particular year and that are associated with a particular domain, facilitate the client data to be processed by the OSP 1098 in order to apply one or more digital rules based on whether a nexus threshold has been met for particular domain in a particular calendar year. For example, such may be useful for a client entity or OSP 1098 to determine whether the client entity is subject to sales tax regulations for a particular domain and is obligated to collect and remit sales tax for particular domain, and then to trigger the OSP 1098 to automatically start to compute and initiate collection of applicable transaction taxes for the client, and also register the client in the applicable domain for purposes of collecting and remitting transaction tax in that domain). In the present example, the stored digital rules facilitate determining whether an economic nexus is established for purposes of remitting transaction tax in the certain domain (e.g., tax jurisdiction). However, different states have different thresholds for determining whether there is an economic nexus, which provides a problem for retailers in determining whether they are compliant with the tax rules in various jurisdictions, especially when the retailers have ever changing total revenue and numbers of transactions in various different domains (e.g., tax jurisdictions). Determining tax compliance under such circumstances for multiple retailers in various different jurisdictions according to the various different rules for the different tax jurisdictions, communicating such information to the retailers or other entities efficiently, computing tax obligations and electronically collecting the correct tax amount as transactions are occurring and rules are changing presents a technical problem in order to do so in a timely and efficient manner over computer networks and in a way that integrates well into existing technical environments in which tax assistance is provided. The present disclosure provides systems and methods that solve this technical problem by improving the speed, efficiency and accuracy of such specialized software platforms and computer networks.

For example, the digital rules applied by the OSP 1098 may be based on regulations regarding a monetary amount of sales that are associated with each of various tax jurisdictions (e.g., states) and/or a volume of sales transactions that are associated with each of various tax jurisdictions. In an embodiment, the regulation may indicate the client entity is obligated to collect and remit sales tax in a particular tax jurisdiction if a particular economic nexus is met. For example, this particular economic nexus may be that within a particular calendar year, the total number of transactions exceed a particular threshold and the sum of the transaction amounts of all those transactions in that calendar year exceed another threshold. Thus, the digital rule based on the regulation will test the datasets representing those transactions to determine whether the thresholds are met for those datasets.

In the present embodiment, the computer system of the OSP 1098 applies such a digital rule to each cell of the matrix of FIG. 20, as each cell contains datasets for a particular year and particular tax jurisdiction. In various embodiments, different digitals rule may be applied to different cells associated with different domains, as each domain (e.g., tax jurisdiction) may have different tax regulations on which the digital rules are based. For example, as shown in FIG. 21, for each cell in the matrix of FIG. 20, the OSP 1098 calculates the sum of the transaction amounts (represented by parameter value BX in each dataset) of all the datasets in the cell, which represents the monetary amount of sales for the client entity in the particular year and domain associated with that cell. The OSP 1098 then determines whether this sum exceeds a threshold (TH1), represented by inequality 2101. For each cell in the matrix of FIG. 20, the OSP 1098 may also calculate the total number of datasets (N) in the cell, which represents the total number of transactions of the client entity in the domain and calendar year associated with that cell. The OSP 1098 then determines whether the total number of datasets (N) in the cell exceeds a threshold (TH2), represented by inequality 2102. According to the digital rule in the present example, if the sum of the transaction amounts for a particular cell exceeds a threshold TH1 and the total number of datasets in the cell exceeds threshold TH2 (i.e., if inequality 2101 and inequality 2102 exist for that particular cell), then the economic nexus for the domain and year associated with that particular cell is met and the OSP 1098 may as a result (e.g., depending on settings set by the client shown in FIGS. 13-18) automatically start determining the tax obligations for transactions in the domain associated with that cell and start assessing sales tax immediately, and/or automatically initiate registration for the client with a tax authority for the domain, and/or send notifications, such as notification 1079, regarding the economic nexus threshold being crossed.

Figure 22:
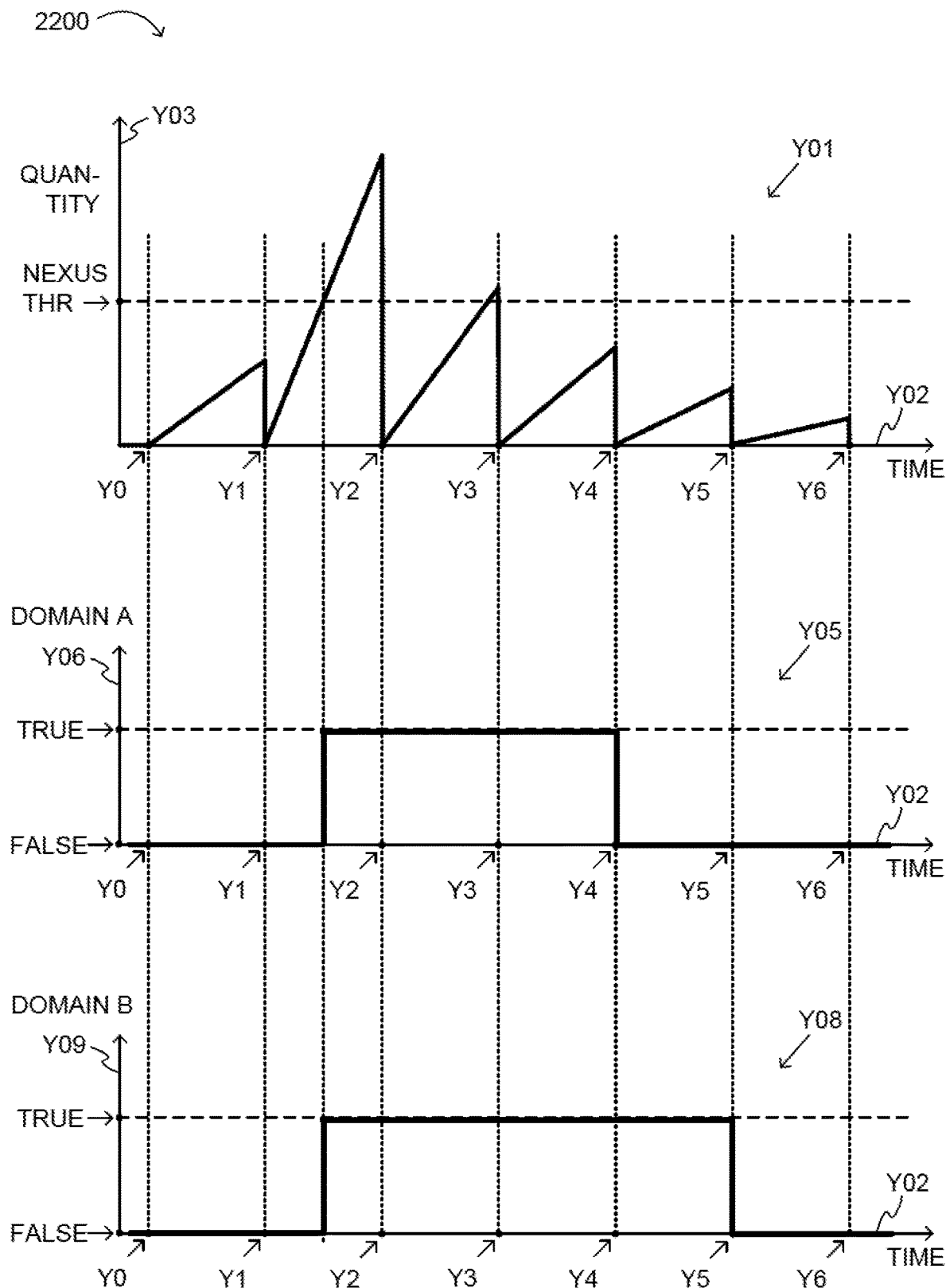
FIG. 22 is a timeline chart illustrating a sample time evolution indicating whether or not transactions taxes are being automatically collected for a client and when de-registration for the client may occur in two different domains based on the same economic nexus threshold for each domain, but different nexus-ending rules for each domain, according to various embodiments of the disclosure, which is an improvement in automated computerized systems.

FIG. 22 is a timeline chart 2200 illustrating a sample time evolution indicating whether or not transactions taxes are being automatically collected for a client and when de-registration for the client may occur in two different domains based on the same economic nexus threshold for each domain, but different nexus-ending rules for each domain, according to various embodiments of the disclosure, which is an improvement in automated computerized systems.

Shown in FIG. 22 is a sample time evolution relating to two different domains (Domain A and Domain B) with different nexus-ending rules. In particular, the nexus-ending rules indicate at what point the seller may stop collecting and remitting transaction taxes based on economic nexus thresholds no longer being met or exceeded over a particular time period. In various embodiments, such rules may be represented by or converted to digital rules, such as digital tax rules 1070 of FIG. 10.

The time axis Y02 is common to all the time evolution charts (chart Y01, chart Y05 and chart Y08) and measures years, but other periods could be used, such as quarters. The vertical axis Y03 shows a measurable quantity of transactions that is first to cross the threshold (number of transactions or total monetary amount indicated by the label "quantity" on the vertical axis Y03 of chart Y01). The threshold is indicated by the horizontal line labeled "Nexus Thr" on chart Y01. The vertical axis Y06 of chart Y05 and vertical axis Y09 of chart Y08 indicate a binary value of true or false indicating true if the seller is to collect and remit sales tax for the respective domain (or is to be registered to do so with the respective domain) based on whether and when the threshold shown in chart Y01 has been crossed in either direction by the quantity of transactions of the seller shown in chart Y01.

In the present example, as shown on chart Y01, the quantity of transactions for the seller crossed the economic threshold half way between year Y1 and year Y2. As a result, the value of the vertical axis Y06 of chart Y05 switches from false to true half way between year Y1 and year Y2 on horizontal axis Y02. Similarly, the value indicated on the vertical axis Y09 of chart Y05 also switches from false to true half way between year Y1 and year Y2. At the end of year Y3, however, as shown on chart Y01, the threshold is no longer met or exceeded. Therefore, according to the nexus-ending rules for Domain A, the value of the vertical axis Y06 of chart Y05 switches from true to false at the beginning of the next year (year Y4). However, according to the different nexus-ending rules for Domain A, the vertical axis Y09 of chart Y08 remains true and does not switch from true to false until the beginning of the following year (year Y5). Thus, in some embodiments, the OSP 1098 over time may automatically start or stop the tax obligation calculation, tax collection, and tax registration or deregistration activities for Domain A based on the true or false value of the vertical Y06 axis of chart Y05. Also, the OSP 1098 over time may automatically start or stop the tax obligation calculation, tax collection, and tax registration or deregistration activities for Domain B based on the true or false value of the vertical Y09 axis of chart Y08.

Figure 23:
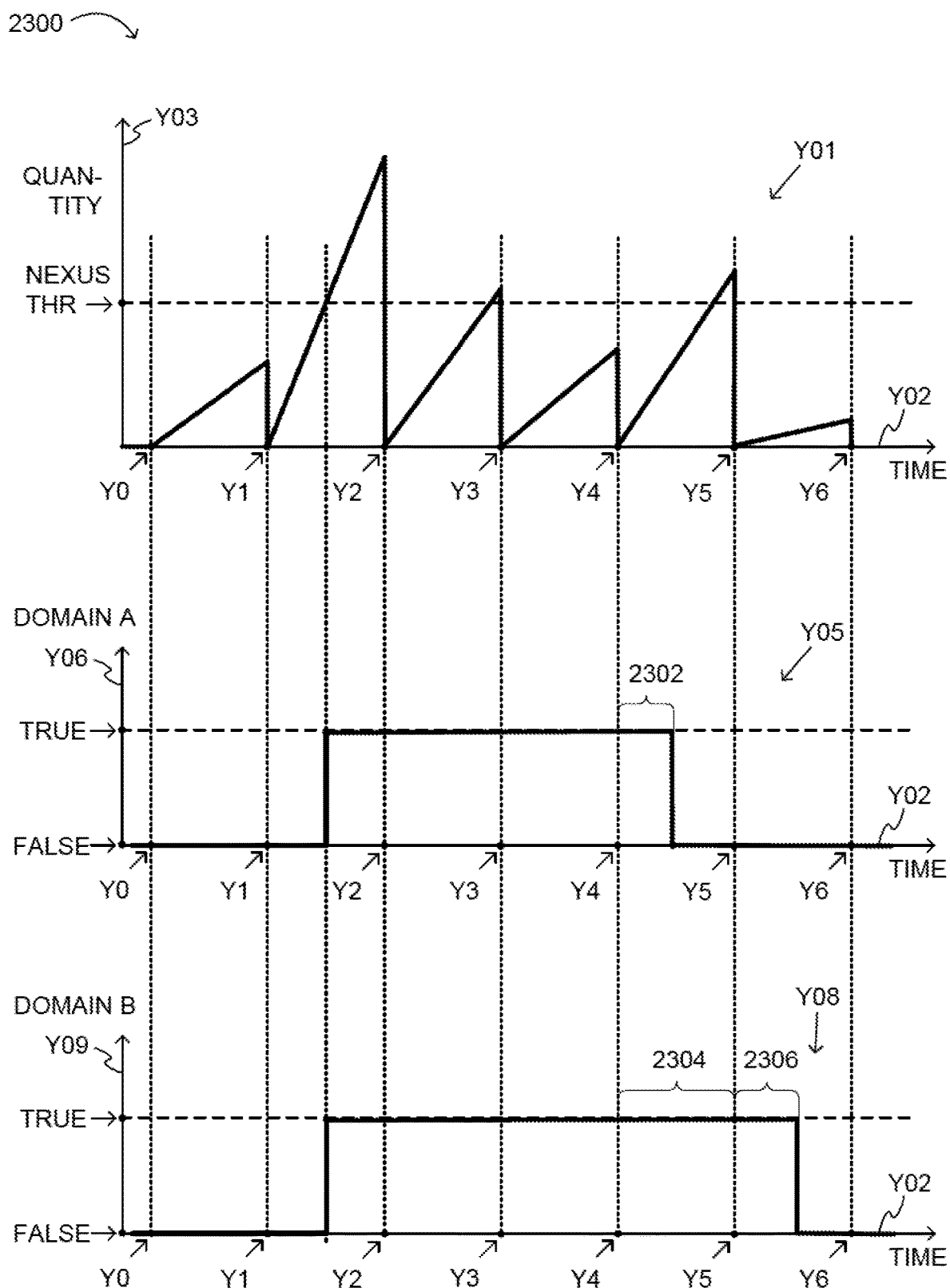
FIG. 23 is a timeline chart illustrating a sample time evolution indicating whether or not transactions taxes are being automatically collected for a client and when de-registration for the client may occur in two different domains based on the same economic nexus threshold for each domain, but different nexus-ending rules for each domain and de-registration for the client based on a configurable cool-off period or through predictive analytics for when the economic nexus threshold is no longer crossed, according to various embodiments of the disclosure, which is an improvement in automated computerized systems.

FIG. 23 is a timeline chart illustrating a sample time evolution indicating whether or not transactions taxes are being automatically collected for a client and when de-registration for the client may occur in two different domains based on the same economic nexus threshold for each domain, but different nexus-ending rules for each domain and de-registration for the client based on a configurable cool-off period or through predictive analytics for when the economic nexus threshold is no longer crossed, according to various embodiments of the disclosure, which is an improvement in automated computerized systems. In the example shown in FIG. 23, the sales number in Y4 would warrant not to renew or keep the registration for collection of sales tax in Y5. By configuring an extended cool-off period, the automated flow described in FIG. 23 is further optimized to avoid an unnecessary and undesired series of registration and de-registration events.

In an example embodiment, the data collected from the seller over many years combined with other data from external or internal systems of the OSP 1098 may train an analytics prediction model that suggests to retain the registration for longer periods even when the current data flow suggests to trigger the re-registration procedure. This avoids unwanted cost for registration and deregistration activities and the associated legal obligations.

The two outlined optimizations enable avoiding unnecessary registration and de-registration events and are independent from the event that the nexus status has changed and, therefore, the collection of taxes shall be commenced/suspended. In particular, for Domain A, the OSP 1098 has a cool-off period 2302 after the threshold is no longer met or exceeded before stopping the automatic collection of sales tax for the seller or deregistering the seller. In some embodiments, the cool-off period 2302 may be a standard amount of time after the nexus threshold is no longer met or exceeded. However, for Domain B, the OSP 1098 has a prediction period 2304 after the threshold is no longer met or exceeded which may use the sales amount indicated on vertical axis Y09 in which the OSP 1098 will predict whether and for how long the sales amount indicated on vertical axis Y03 will continue to be below the threshold. The OSP 1098 may keep the value indicated on the vertical axis Y09 as true for an extended period of time based on a prediction that the sales amount indicated on vertical axis Y03 will again cross the threshold in the current year (e.g., Y4), which it did as indicated on chart Y01, after which a standard cool off period 2306 may be entered.

The embodiments described above may also use synchronous or asynchronous client-server computing techniques, including software as a service (SaaS) techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and further communicate using message passing techniques. Equivalent synchronous embodiments are also supported. Also, other functions could be implemented and/or performed by each component/module, and in different orders, and by different components/modules, yet still achieve the functions of the systems and methods described herein.

In addition, programming interfaces to the data stored as part of the system controller 210 and other system components described herein may be available by mechanisms such as through C, C++, C #, and Java APIs; libraries for accessing files, databases, or other data repositories; through scripting languages such as JavaScript and VBScript; or through Web servers, FTP servers, or other types of servers providing access to stored data. The databases described herein and other system components may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality may be provided by each component/module, or existing functionality could be distributed amongst the components/modules in different ways, yet still achieve the functions described herein.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer system including:
one or more processors; and
a non-transitory computer-readable storage medium having stored thereon instructions which, when executed by the one or more processors, cause the computer system to perform:
receiving, from a client device associated with a seller comprising a primary entity, instructions via an automatic collection of sales tax option selection, in which the instructions received from the client device cause a tax engine of an online service provider to detect exactly when an economic nexus threshold is crossed based on relationship instances representing transactions of the seller and digital tax rules;
in response to detecting that the economic nexus threshold is crossed, automatically producing a resource representing a sales tax amount, in which the producing the resource representing the sales tax amount in response to detecting that the economic nexus threshold is crossed includes:
receiving a dataset on behalf of the primary entity, in which the dataset includes data regarding a relationship instance associated with the primary entity and that represents a transaction of the primary entity;
determining a domain associated with the relationship instance;
parsing from the dataset a base value associated with the dataset representing a value of the transaction;
accessing an electronic true or false flag associated with the primary entity and with the domain;
checking a flag status of the true or false flag; and
determining that the flag status is false, and in response to such determination, performing a first set of operations; or
determining that the flag status is true, and in response to such determination, performing a second set of operations;
in which the first set of operations includes:
looking up a first threshold associated with the domain and a second threshold associated with the domain;
accessing a first counter associated with the primary entity and the domain;

incrementing the first counter responsive to receiving the dataset;

determining that the first counter meets or exceeds the first threshold after the incrementing, and in response to such determination, setting the flag status to true;

accessing a second counter representing a present base value associated with the primary entity and the domain;

updating the second counter responsive to and based on the parsed base value;

determining that the second counter meets or exceeds the second threshold after updating the second counter, and in response to such determination, setting the flag status to true; and checking the flag status of the true or false flag;

determining that the flag status is true, and in response to such determination, producing a resource representing a sales tax amount having a non-zero value and that is associated with the relationship instance; and in which the second set of operations includes:

looking up a rate applicable to the dataset based on the domain;

producing, based on the rate and the parsed base value, a resource representing a sales tax amount having a nonzero value and that is associated with the relationship instance; and transmitting, to the client device associated with the seller comprising the primary entity, a notification regarding the resource associated with relationship instance.

2. The computer system of claim 1 in which:
the setting the flag status occurs after the producing the resource.

3. The computer system of claim 1 in which:
the setting the flag status occurs before the producing the resource and the flag status is rechecked before the producing the resource.

4. The computer system of claim 1, in which the instructions further cause the computer system to perform:

receiving a plurality of additional datasets on behalf of the primary entity, in which each dataset of the plurality of additional datasets includes data regarding a respective additional relationship instance associated with the primary entity and with a respective additional domain associated with the respective additional relationship instance;

for each of the additional respective relationship instances:

accessing an additional electronic true or false flag associated with the primary entity and the respective additional domain;

checking an additional flag status of the additional true or false flag;

determining that the additional flag status is false, and in response to such determination, performing a third set of operations; and;

determining that the additional flag status is true, and in response to such determination, performing a fourth set of operations;

in which the third set of operations includes:

looking up a first additional threshold associated with the respective additional domain and a second additional threshold associated with the respective additional domain;

accessing a first additional counter associated with the primary entity and the respective additional domain;

incrementing the first additional counter responsive to receiving the dataset;

setting the additional flag status to true if the first additional counter meets or exceeds the first additional threshold after the incrementing the first additional counter;

accessing a second additional counter representing an additional present base value associated with the primary entity and the respective additional domain;

updating the second additional counter responsive to and based on a base value associated with the additional respective relationship instance; and setting the additional flag status to true if the second additional counter meets or exceeds the second additional threshold after updating the second additional counter;

checking the additional flag status of the additional true or false flag; and determining that the additional flag status is false, and in response to such determination, producing a resource representing the sales tax amount and having a zero value and that is associated with the respective additional domain and the additional respective relationship instance; and in which the fourth set of operations includes:

looking up an additional rate applicable to the dataset based on the respective additional domain;

producing based on the additional rate and the base value associated with the dataset an additional resource having nonzero value and that is associated with the respective additional domain and the additional respective relationship instance; and transmitting, to the client device associated with the seller comprising the primary entity, a notification regarding the additional resource associated with the respective additional domain and the additional respective relationship instance.

5. The computer system of claim 1 in which:
the first threshold and the second threshold are defined by one or more digital rules about relationship instances associated with the domain.

6. The computer system of claim 1 in which the instructions further cause the computer system to perform:

receiving an option setting from the primary entity before determining the domain of the relationship instance, and in which the flag status is thus set if the option setting has been thus received, else the flag status is not thus set if the option setting has not been thus received.

7. The computer system of claim 1 in which the instructions further cause the computer system to perform:

determining, by at least one computer processor and according to a warning criterion, that the first counter is approaching the first threshold or that the second counter is approaching the second threshold; and transmitting a warning notification to a the client system device associated with the seller comprising the primary entity responsive to thus determining according to the warning criterion.

8. The computer system of claim 1 in which the looking up the first threshold associated with the domain and the second threshold associated with the domain includes:

looking up the first threshold from digital rules that are specific to the domain associated with the relationship instance; and looking up the second threshold from the digital rules that are specific to the domain associated with the relationship instance.

9. The computer system of claim 1 in which the instructions further cause the computer system to perform:
- receiving a subsequent dataset associated with the domain on behalf of the primary entity, in which the subsequent dataset includes data regarding a follow-up relationship instance associated with the primary entity reversing the first relationship instance;
- decrementing the first counter responsive to receiving the subsequent dataset;
- setting the flag status to false if the first counter no longer meets or exceeds the first threshold;
- updating the second counter responsive to and based on a parsed base value of the subsequent dataset, the updating including subtracting an amount from the second counter based on the parsed base value of the subsequent dataset; and
- determining that the second counter no longer meets or exceeds the second threshold; and
- in response to such determination, setting the flag status to false.

10. The computer system of claim 1 in which the instructions further cause the computer system to perform:
- re-setting one or more of: the first counter and the second counter based on a period of time that has passed since a selectable calendar date.

11. The computer system of claim 10 in which the instructions further cause the computer system to perform:
- looking up the selectable calendar date from a stored memory entry.

12. The computer system of claim 1 in which the instructions further cause the computer system to perform:
- in response to the flag status being set from false to true, transmitting a notification to the client device associated with the seller comprising the primary entity regarding a registration for a client with the domain for remitting resources for relationship instances associated with the domain.

13. The computer system of claim 1 in which the instructions further cause the computer system to perform:
- determining whether one or more digital rules about relationship instances associated with the domain indicate to not count a relationship instance for purposes of determining whether the first counter meets or exceeds the first threshold if an exemption is associated with the relationship instance; and
- determining whether an exemption is associated with the relationship instance, in which the incrementing the first counter is based on a determination that there is not an exemption associated with the relationship instance.

14. The computer system of claim 1 in which the instructions further cause the computer system to perform:
- parsing, from the dataset an identity of the primary entity for the accessing the first counter and the second counter.

15. The computer system of claim 1 in which the instructions further cause the computer system to perform:
- parsing, from the dataset the domain associated with the relationship instance for the accessing the first counter and the second counter.

* * * * *